US010904914B2

United States Patent
Tang et al.

(10) Patent No.: US 10,904,914 B2
(45) Date of Patent: Jan. 26, 2021

(54) TRANSMISSION METHOD, TRANSMISSION APPARATUS, NETWORK DEVICE, AND USER EQUIPMENT

(71) Applicant: HUAWEI TECHNOLOGIES CO., LTD., Guangdong (CN)

(72) Inventors: Xun Tang, Beijing (CN); Wei Quan, Beijing (CN); Jinhua Miao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 159 days.

(21) Appl. No.: 16/021,874

(22) Filed: Jun. 28, 2018

(65) Prior Publication Data
US 2018/0310335 A1 Oct. 25, 2018

Related U.S. Application Data

(63) Continuation of application No. PCT/CN2015/099531, filed on Dec. 29, 2015.

(51) Int. Cl.
*H04W 74/00* (2009.01)
*H04W 72/04* (2009.01)
(Continued)

(52) U.S. Cl.
CPC ........ *H04W 74/004* (2013.01); *H04W 72/04* (2013.01); *H04W 72/0413* (2013.01); *H04W 72/14* (2013.01); *H04W 76/27* (2018.02)

(58) Field of Classification Search
None
See application file for complete search history.

(56) References Cited

U.S. PATENT DOCUMENTS

2013/0163532 A1 6/2013 Anderson et al.
2013/0163537 A1* 6/2013 Anderson ............ H04W 72/02
370/329
(Continued)

FOREIGN PATENT DOCUMENTS

CN 101651601 A 2/2010
CN 101925107 A 12/2010
(Continued)

OTHER PUBLICATIONS

ETSI TS 136 211 V10.0.0 (Jan. 2011),LTE;Evolved Universal Terrestrial Radio Access (E-UTRA);Physical channels and modulation(3GPP TS 36.211 version 10.0.0 Release 10),total 105 pages.

*Primary Examiner* — Faruk Hamza
*Assistant Examiner* — Alan L Lindenbaum
(74) *Attorney, Agent, or Firm* — Womble Bond Dickinson (US) LLP

(57) ABSTRACT

A transmission method, a transmission apparatus, a network device, and user equipment are provided, and are applied to the field of communications technologies. The method includes: configuring, by a base station, a resource request parameter for first UE; allocating a first PUSCH resource used by the first UE to send resource request information; and allocating, to the first UE when the base station detects, on the first PUSCH resource, resource request information sent by the first UE, a second PUSCH resource used for sending data. In this way, PUCCH capacity limitation is effectively mitigated, and more UEs can send resource requests, so that resource usage in an uplink transmission process can be increased, and a system capacity can be increased.

19 Claims, 11 Drawing Sheets

(51) Int. Cl.
*H04W 76/27* (2018.01)
*H04W 72/14* (2009.01)

(56) References Cited

U.S. PATENT DOCUMENTS

2015/0085723 A1\* 3/2015 Chen .................. H04W 72/042
 370/280
2015/0092632 A1 4/2015 Park
2016/0057773 A1 2/2016 Quan et al.

FOREIGN PATENT DOCUMENTS

CN 102123399 A 7/2011
EP 2523520 A1 11/2012
WO 2015122739 A1 8/2015

\* cited by examiner

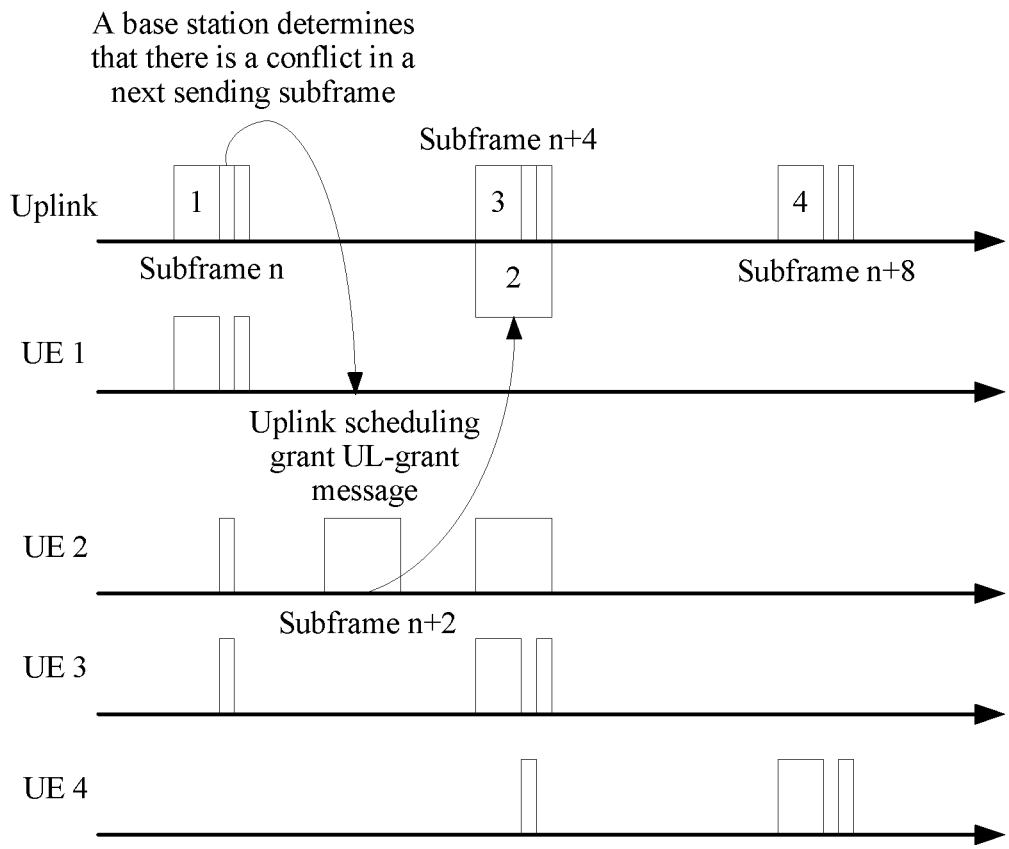

FIG. 7

A base station allocates a PUSCH resource to a first UE, configures a resource request parameter and a time resource occupied to send data on the PUSCH resource, and notifies the resource request parameter and the time resource to the first UE ⟶ 801

If the base station detects, on the PUSCH resource based on the resource request parameter configured for the first UE, resource request information sent by the first UE, the base station processes, on the time resource occupied by the first UE on the PUSCH resource, data sent by the first UE ⟶ 802

FIG. 8

TRANSMISSION METHOD, TRANSMISSION APPARATUS, NETWORK DEVICE, AND USER EQUIPMENT

CROSS-REFERENCE TO RELATED APPLICATIONS

This application is a continuation of International Application No. PCT/CN2015/099531, filed on Dec. 29, 2015, the disclosure of which is hereby incorporated by reference in its entirety.

TECHNICAL FIELD

The present invention relates to the field of communications technologies, and in particular, to a transmission method, a transmission apparatus, a network device, and user equipment.

BACKGROUND

In a Long Term Evolution (LTE) system, conventional uplink data transmission is performed based on dynamic scheduling. If user equipment (UE) in a connected mode that implements uplink synchronization needs to send uplink data, the UE needs to send, on a physical uplink control channel (PUCCH), an uplink scheduling request (SR) to a base station, and the base station sends an uplink scheduling grant (UL-Grant) on a physical downlink control channel (PDCCH), to allocate a PUSCH resource to the UE.

However, as a transmission requirement of the UE increases, PUCCH resources and physical uplink shared channel (PUSCH) resources are limited. Particularly, for a transmission scenario that is of a relatively small data packet and that requires a low delay, such as the Internet of Things or a multi-UE real-time game, signaling overheads are high and a scheduling process is complex in a conventional dynamic scheduling manner. Also, in an existing semi-persistent scheduling (SPS) or a pre-scheduling resource allocation manner, when there are at least two UEs for a scheduled contention resource, a conflict cannot be avoided, and consequently resources are wasted, and a transmission delay is increased.

SUMMARY

The present invention provides a transmission method, a transmission apparatus, a network device, and user equipment, so as to increase resource usage in an uplink transmission process, and increase a system capacity.

According to a first aspect, a transmission method is provided, and the method includes:

configuring, by a base station, a resource request parameter for first user equipment UE, and sending the resource request parameter to the first UE;

allocating, by the base station, a first physical uplink shared channel (PUSCH) resource to the first UE, where the first PUSCH resource is used by the first UE to send resource request information; and allocating, by the base station to the first UE when the base station detects, on the first PUSCH resource, resource request information sent by the first UE based on the resource request parameter, a second PUSCH resource used for sending data.

With reference to the first aspect, in a first possible implementation of the first aspect, the allocating, by the base station, a first PUSCH resource to the first UE includes:

sending, by the base station, a first uplink scheduling grant (UL-grant) message to the first UE, where the first UL-grant message includes information about the first PUSCH resource allocated to the first UE; or notifying, by the base station, PUSCH scheduling information of second UE to the first UE, where the PUSCH scheduling information of the second UE includes information about a third PUSCH resource that is allocated by the base station to the second UE and that is used for sending data; and instructing the first UE to use the third PUSCH resource as the first PUSCH resource that is used by the first UE to send resource request information, where the base station configures different cyclic shift values for the first UE and the second UE, so that the first UE and the second UE use the third PUSCH resource by using the different cyclic shift values; or using, by the base station as the first PUSCH resource, an uplink semi-persistent scheduling SPS resource pre-allocated to the first UE.

With reference to the first possible implementation of the first aspect, in a second possible implementation of the first aspect, the notifying, by the base station, PUSCH scheduling information of second UE to the first UE includes:

sending, by the base station, a radio network temporary identifier (RNTI) used by the second UE to the first UE, so that the first UE obtains the PUSCH scheduling information of the second UE based on the RNTI used by the second UE.

With reference to any one of the first aspect, and the first and the second possible implementations of the first aspect, in a third possible implementation of the first aspect, the allocating, by the base station to the first UE when the base station detects resource request information sent by the first UE, a second PUSCH resource used for sending data includes:

if the base station pre-allocates a common uplink SPS resource to the first UE and at least one third UE, detects resource request information separately sent by the first UE and the at least one third UE, and determines that the first UE and the at least one third UE request to send data on the common uplink SPS resource, allocating, by the base station, a PUSCH resource that is different from a PUSCH resource used by the at least one third UE to the first UE, and using the PUSCH resource as the second PUSCH resource used by the first UE to send data.

With reference to the third possible implementation of the first aspect, in a fourth possible implementation of the first aspect, the second PUSCH resource is the common uplink SPS resource.

With reference to any one of the first aspect, and the first and the second possible implementations of the first aspect, in a fifth possible implementation of the first aspect, the allocating, by the base station to the first UE when the base station detects resource request information sent by the first UE, a second PUSCH resource used for sending data includes:

if the base station pre-allocates a common uplink SPS resource to the first UE and at least one third UE, detects resource request information separately sent by the first UE and the at least one third UE, and determines that the first UE and the at least one third UE request to send data on the common uplink SPS resource, indicating, by the base station, time resources on which the first UE and the at least one third UE separately occupy the uplink SPS resource, and using, by the base station as the second PUSCH resource that is allocated to the first UE and that is used for sending data, the uplink SPS resource occupied by the first UE on an indicated time resource.

With reference to the fifth possible implementation of the first aspect, in a sixth possible implementation of the first aspect, the indicating, by the base station, a time resource on which the first UE occupies the uplink SPS resource includes:

sending, by the base station, a second UL-grant message to the first UE, where the second UL-grant message carries indication information, and the indication information is used to indicate the time resource on which the first UE occupies the uplink SPS resource; where the base station marks, based on a mapping relationship between a bit that can be multiplexed in the second UL-grant message and a time resource of the uplink SPS resource, the indication information in a bit that is corresponding to the time resource allocated to the first UE and that is in the bit that can be multiplexed.

With reference to any one of the first aspect, and the first to the sixth possible implementations of the first aspect, in a seventh possible implementation of the first aspect, the resource request parameter includes one or more of a cyclic shift value, a time-frequency resource location, a resource request period, and an orthogonal cover code (OCC).

With reference to any one of the first aspect, and the first to the seventh possible implementations of the first aspect, in an eighth possible implementation of the first aspect, a pilot symbol of the first PUSCH resource is used by the first UE to send resource request information.

According to a second aspect, a transmission method is provided, including:

allocating, by a base station to first user equipment UE, a physical uplink shared channel PUSCH resource used for sending data, where the first UE and at least one second UE share the PUSCH resource;

configuring, by the base station for the first UE, a resource request parameter and a time resource occupied to send data on the PUSCH resource, and notifying the resource request parameter and the time resource to the first UE; and if the base station detects, on the PUSCH resource based on the resource request parameter configured for the first UE, resource request information sent by the first UE, processing, by the base station on the time resource occupied by the first UE on the PUSCH resource, data sent by the first UE.

With reference to the second aspect, in a first possible implementation of the second aspect, the resource request parameter includes a cyclic shift value and a time-frequency resource location; and both the time resource occupied to send data on the PUSCH resource and a cyclic shift value that are of the first UE are different from those of the at least one second UE.

With reference to the second aspect, or the first possible implementation of the second aspect, in a second possible implementation of the second aspect, the base station notifies, to the first UE by using a radio resource control (RRC) message or an uplink scheduling grant UL-grant message, the resource request parameter and the time resource occupied to send data on the PUSCH resource.

According to a third aspect, a transmission method is provided, including:

receiving, by first user equipment UE, a resource request parameter configured by a base station;

determining, by the first UE, a first physical uplink shared channel PUSCH resource allocated by the base station, and sending resource request information to the base station on the first PUSCH resource based on the resource request parameter; and determining, by the first UE, a second PUSCH resource that is allocated by the base station and that is used for sending data, and sending data on the second PUSCH resource.

With reference to the third aspect, in a first possible implementation of the third aspect, the determining, by the first UE, a first PUSCH resource allocated by the base station includes:

determining, by the first UE based on a received first uplink scheduling grant UL-grant message sent by the base station, the first PUSCH resource allocated by the base station; or determining, by the first UE based on PUSCH scheduling information that is of a second UE and that is notified by the base station, a third PUSCH resource that is included in the PUSCH scheduling information of the second UE, allocated by the base station to the second UE, and used for sending data as the first PUSCH resource allocated by the base station; or determining, by the first UE based on an instruction of the base station, an uplink semi-persistent scheduling SPS resource pre-allocated by the base station as the first PUSCH resource allocated by the base station.

With reference to the first possible implementation of the third aspect, in a second possible implementation of the third aspect, the determining, by the first UE based on PUSCH scheduling information that is of the second UE and that is notified by the base station, a PUSCH resource of the second UE that is included in the PUSCH scheduling information of the second UE as the first PUSCH resource allocated by the base station includes:

obtaining, by the first UE, the PUSCH scheduling information of the second UE based on a received radio network temporary identifier (RNTI) that is sent by the base station and that is used by the second UE.

With reference to the first or the second possible implementation of the third aspect, in a third possible implementation of the third aspect, if the first UE determines the third PUSCH resource as the first PUSCH resource, the first UE sends resource request information to the base station on the third PUSCH resource based on a cyclic shift value configured by the base station for the first UE, where the cyclic shift value of the first UE is different from a cyclic shift value of the second UE.

With reference to any one of the third aspect, and the first to the third possible implementation of the third aspect, in a fourth possible implementation of the third aspect, the determining, by the first UE, a second PUSCH resource that is allocated by the base station and that is used for sending data, and sending data on the second PUSCH resource includes:

determining, by the first UE based on a received instruction sent by the base station, that the instruction includes information about the second PUSCH resource; and sending data on the second PUSCH resource based on the instruction.

With reference to the fourth possible implementation of the third aspect, in a fifth possible implementation of the third aspect, if the first UE knows an uplink SPS resource that is allocated by the base station to the first UE and that is used for sending data, the determining, by the first UE based on a received instruction sent by the base station, that the instruction includes information about the second PUSCH resource, and sending data on the second PUSCH resource based on the instruction includes:

receiving, by the first UE, a second UL-grant message sent by the base station, and determining, based on indication information marked in a bit that can be multiplexed in the second UL-grant message and a mapping relationship between the bit that can be multiplexed and a time resource of the uplink SPS resource, a time resource that is allocated by the base station to the first UE and that is occupied on the uplink SPS resource; and sending data on the time resource occupied on the uplink SPS resource.

With reference to any one of the third aspect, and the first to the fifth possible implementation of the third aspect, in a sixth possible implementation of the third aspect, the method further includes:

sending, by the first UE, data on the uplink SPS resource if the first UE knows the uplink SPS resource that is allocated by the base station to the first UE and that is used for sending data, and receives, after sending resource request information to the base station, no information about the second PUSCH resource that is allocated by the base station and that is used for sending data.

With reference to any one of the third aspect, and the first to the sixth possible implementation of the third aspect, in a seventh possible implementation of the third aspect, the resource request parameter includes one or more of a cyclic shift value, a time-frequency resource location, a resource request period, and an orthogonal cover code (OCC).

With reference to any one of the third aspect, and the first to the seventh possible implementation of the third aspect, in an eighth possible implementation of the third aspect, the first UE sends resource request information to the base station on a pilot symbol of the first PUSCH resource based on the resource request parameter.

According to a fourth aspect, a transmission apparatus is provided, including:

a configuration unit, configures a resource request parameter for first user equipment UE, and sends the resource request parameter to the first UE;

a first allocation unit, configured to allocate a first physical uplink shared channel PUSCH resource to the first UE, where the first PUSCH resource is used by the first UE to send resource request information;

a detection unit, configured to detect, on the first PUSCH resource, resource request information sent by the first UE based on the resource request parameter; and a second allocation unit, configured to: when the detection unit detects, on the first PUSCH resource, the resource request information sent by the first UE based on the resource request parameter, allocate, to the first UE, a second PUSCH resource used for sending data.

With reference to the fourth aspect, in a first possible implementation of the fourth aspect, the first allocation unit is configured to:

send a first uplink scheduling grant UL-grant message to the first UE, where the first UL-grant message includes information about the first PUSCH resource allocated to the first UE; or notify PUSCH scheduling information of second UE to the first UE, where the PUSCH scheduling information of the second UE includes information about a third PUSCH resource that is allocated by the apparatus to the second UE and that is used for sending data; and instruct the first UE to use the third PUSCH resource as the first PUSCH resource that is used by the first UE to send resource request information, where the base station configures different cyclic shift values for the first UE and the second UE, so that the first UE and the second UE use the third PUSCH resource by using the different cyclic shift values; or use, as the first PUSCH resource, an uplink semi-persistent scheduling (SPS) resource pre-allocated to the first UE.

With reference to the first possible implementation of the fourth aspect, in a second possible implementation of the fourth aspect, the first allocation unit is configured to:

send a radio network temporary identifier (RNTI) used by the second UE to the first UE, so that the first UE obtains the PUSCH scheduling information of the second UE based on the RNTI used by the second UE.

With reference to any one of the fourth aspect, and the first and the second possible implementations of the fourth aspect, in a third possible implementation of the fourth aspect, the apparatus further includes a pre-allocation unit, configured to pre-allocate a common uplink SPS resource to the first UE and at least one third UE, where if the pre-allocation unit pre-allocates the common uplink SPS resource to the first UE and the at least one third UE, and the detection unit detects resource request information separately sent by the first UE and the at least one third UE, and determines that the first UE and the at least one third UE request to send data on the common uplink SPS resource, the second allocation unit allocates a PUSCH resource that is different from a PUSCH resource used by the at least one third UE to the first UE, and uses the PUSCH resource as the second PUSCH resource used by the first UE to send data.

With reference to the third possible implementation of the fourth aspect, in a fourth possible implementation of the fourth aspect, the second PUSCH resource is the common uplink SPS resource.

With reference to any one of the fourth aspect, and the first and the second possible implementations of the fourth aspect, in a fifth possible implementation of the fourth aspect, the apparatus further includes a pre-allocation unit, configured to pre-allocate a common uplink SPS resource to the first UE and at least one third UE, where if the pre-allocation unit pre-allocates the common uplink SPS resource to the first UE and the at least one third UE, and the detection unit detects resource request information separately sent by the first UE and the at least one third UE, and determines that the first UE and the at least one third UE request to send data on the common uplink SPS resource, the second allocation unit indicates time resources on which the first UE and the at least one third UE separately occupy the uplink SPS resource, and uses, as the second PUSCH resource that is allocated to the first UE and that is used for sending data, the uplink SPS resource occupied by the first UE on an indicated time resource.

With reference to the fifth possible implementation of the fourth aspect, in a sixth possible implementation of the fourth aspect, the second allocation unit is configured to:

send a second UL-grant message to the first UE, where the second UL-grant message carries indication information, and the indication information is used to indicate a time resource on which the first UE occupies the uplink SPS resource; where based on a mapping relationship between a bit that can be multiplexed in the second UL-grant message and a time resource of the uplink SPS resource, the indication information is marked in a bit that is corresponding to the time resource allocated to the first UE and that is in the bit that can be multiplexed.

With reference to any one of the fourth aspect, and the first to the sixth possible implementations of the fourth aspect, in a seventh possible implementation of the fourth aspect, the resource request parameter includes one or more of a cyclic shift value, a time-frequency resource location, a resource request period, and an orthogonal cover code (OCC).

With reference to any one of the fourth aspect, and the first to the seventh possible implementations of the fourth aspect, in an eighth possible implementation of the fourth aspect, a pilot symbol of the first PUSCH resource is used by the first UE to send resource request information.

According to a fifth aspect, a transmission apparatus is provided, including:

a first allocation unit, configured to: allocate, to first user equipment UE, a physical uplink shared channel (PUSCH) resource used for sending data, where the first UE and at least one second UE share the PUSCH resource; and configure, for the first UE, a resource request parameter and a time resource occupied to send data on the PUSCH resource;

a notification unit, configured to notify, to the first UE, the resource request parameter and the time resource occupied to send data on the PUSCH resource that are configured by the first allocation unit;

a detection unit, configured to detect, on the PUSCH resource based on the resource request parameter configured for the first UE, resource request information sent by the first UE; and a processing unit, configured to: if the detection unit detects, on the PUSCH resource based on the resource request parameter configured for the first UE, resource request information sent by the first UE, process, on the time resource occupied by the first UE on the PUSCH resource, data sent by the first UE.

With reference to the fifth aspect, in a first possible implementation of the fifth aspect, the resource request parameter includes a cyclic shift value and a time-frequency resource location; and both the time resource occupied to send data on the PUSCH resource and a cyclic shift value that are of the first UE are different from those of the at least one second UE.

With reference to the fifth aspect or the first possible implementation of the fifth aspect, in a second possible implementation of the fifth aspect, the notification unit is configured to:

notify, to the first UE by using a radio resource control RRC message or an uplink scheduling grant UL-grant message, the resource request parameter and the time resource occupied to send data on the PUSCH resource.

According to a sixth aspect, a transmission apparatus is provided, applied to first user equipment UE, and including:

a receiving unit, configured to receive a resource request parameter configured by a base station;

a first determining unit, configured to determine a first physical uplink shared channel PUSCH resource allocated by the base station;

a first sending unit, configured to send resource request information to the base station on the first PUSCH resource based on the resource request parameter;

a second determining unit, configured to determine a second PUSCH resource that is allocated by the base station and that is used for sending data; and a second sending unit, configured to send data on the second PUSCH resource.

With reference to the sixth aspect, in a first possible implementation of the sixth aspect, the first determining unit is configured to:

determine, based on a received first uplink scheduling grant UL-grant message sent by the base station, the first PUSCH resource allocated by the base station; or determine, based on PUSCH scheduling information that is of a second UE and that is notified by the base station, a third PUSCH resource that is included in the PUSCH scheduling information of the second UE, allocated by the base station to the second UE, and used for sending data as the first PUSCH resource allocated by the base station; or determine, based on an instruction of the base station, an uplink semi-persistent scheduling (SPS) resource pre-allocated by the base station as the first PUSCH resource allocated by the base station.

With reference to the first possible implementation of the sixth aspect, in a second possible implementation of the sixth aspect, the first determining unit is configured to:

obtain the PUSCH scheduling information of the second UE based on a received radio network temporary identifier (RNTI) that is sent by the base station and that is used by the second UE.

With reference to the first or the second possible implementation of the sixth aspect, in a third possible implementation of the sixth aspect, if the first determining unit determines the third PUSCH resource as the first PUSCH resource, the first sending unit sends resource request information to the base station on the third PUSCH resource based on a cyclic shift value configured by the base station for the first UE, where the cyclic shift value of the first UE is different from a cyclic shift value of the second UE.

With reference to any one of the sixth aspect, and the first to the third possible implementations of the sixth aspect, in a fourth possible implementation of the sixth aspect, the second determining unit is configured to:

determine, based on a received instruction sent by the base station, that the instruction includes information about the second PUSCH resource; and send data on the second PUSCH resource based on the instruction.

With reference to the fourth possible implementation of the sixth aspect, in a fifth possible implementation of the sixth aspect, if the first UE knows an uplink SPS resource that is allocated by the base station to the first UE and that is used for sending data, the second determining unit is configured to:

receive a second UL-grant message sent by the base station, and determine, based on indication information marked in a bit that can be multiplexed in the second UL-grant message and a mapping relationship between the bit that can be multiplexed and a time resource of the uplink SPS resource, a time resource that is allocated by the base station and that is occupied on the uplink SPS resource; and send data on the time resource occupied on the uplink SPS resource.

With reference to any one of the sixth aspect, and the first to the fifth possible implementations of the sixth aspect, in a sixth possible implementation of the sixth aspect, wherein the first sending unit is further configured to send data on the uplink SPS resource if the first UE knows the uplink SPS resource that is allocated by the base station to the first UE and that is used for sending data, and receives, after sending resource request information to the base station, no information about the second PUSCH resource that is allocated by the base station and that is used for sending data.

With reference to any one of the sixth aspect, and the first to the sixth possible implementations of the sixth aspect, in a seventh possible implementation of the sixth aspect, the resource request parameter includes one or more of a cyclic shift value, a time-frequency resource location, a resource request period, and an orthogonal cover code (OCC).

With reference to any one of the sixth aspect, and the first to the seventh possible implementations of the sixth aspect, in an eighth possible implementation of the sixth aspect, the first sending unit sends resource request information to the base station on a pilot symbol of the first PUSCH resource based on the resource request parameter.

According to a seventh aspect, a network device is provided, and includes a transceiver, a processor, a memory, and a bus, where the transceiver, the processor, and the memory are all connected to the bus, the memory stores a group of programs, and the processor is configured to invoke the programs stored in the memory, so that the network device performs the method according to any one of the first aspect, and the first to the eighth possible implementations of the first aspect.

According to an eighth aspect, a network device is provided, and includes a transceiver, a processor, a memory, and a bus, where the transceiver, the processor, and the memory are all connected to the bus, the memory stores a group of programs, and the processor is configured to invoke the programs stored in the memory, so that the network device performs the method according to any one of the second aspect, and the first and the second possible implementations of the second aspect.

According to a ninth aspect, user equipment is provided, and includes a transceiver, a processor, a memory, and a bus, where the transceiver, the processor, and the memory are all connected to the bus, the memory stores a group of programs, and the processor is configured to invoke the programs stored in the memory, so that the user equipment performs the method according to any one of the third aspect, and the first to the eighth possible implementations of the third aspect.

In this application, the base station allocates, to the first UE, the first PUSCH resource used for sending resource request information, and allocates, to the first UE after receiving resource request information of the first UE, the second PUSCH resource used for sending data. In this way, the first UE can occupy a PUSCH resource allocated to any UE, to send resource request information, so that PUCCH capacity limitation is effectively mitigated, and more UEs can send resource requests. In addition, a problem of a conflict between UEs in a contention-based semi-persistent scheduling process can be resolved, so that PUSCH resources are more effectively used, and an uplink transmission delay is reduced. In conclusion, resource usage in an uplink transmission process can be increased, and a system capacity can be increased.

BRIEF DESCRIPTION OF DRAWINGS

FIG. 7 is a schematic diagram of scheduling UE according to this application;

FIG. 8 is a flowchart of a transmission method according to Embodiment 3 of this application;

DESCRIPTION OF EMBODIMENTS

To make the objectives, technical solutions, and advantages of this application clearer, the following further describes this application in detail with reference to the accompanying drawings. Apparently, the described embodiments are merely some rather than all of the embodiments of this application. All other embodiments obtained by persons of ordinary skill in the art based on the embodiments of this application without creative efforts shall fall within the protection scope of this application.

Considering that in an uplink data transmission process in the prior art, signaling overheads for scheduling UE are relatively high, a scheduling delay is relatively long, and transmission resources such as PUCCH resources and PUSCH resources are limited when a large quantity of UEs need to transmit uplink data, this application provides the following solution: A base station configures a resource request parameter for UE, and notifies, to the UE, an available PUSCH resource used for sending resource request information. The base station may allocate, to the UE, any PUSCH resource that is used by another UE to send data, where both the UE and the another UE are scheduled. When the UE needs to send data, the UE first sends, on the PUSCH resource that is allocated by the base station and that is used for sending resource request information, resource request information to the base station based on the resource request parameter configured by the base station, and then sends data on the PUSCH resource that is allocated by the base station to the UE and that is used for sending data. Therefore, in this application, a resource used by the UE to send resource request information is extended to any PUSCH resource, so that available resources used by the UE to send resource request information are increased. In addition, after receiving the resource request information sent by the UE, and determining that another UE requests a same resource as the UE, the base station can flexibly allocate, to the UE, a PUSCH resource that is used for sending data and that is different from a PUSCH resource of the another UE, so that a conflict caused when a plurality of UEs use a same PUSCH resource can be effectively avoided. In summary, according to the solution provided in this application, transmission resource limitation in an uplink transmission process can be effectively mitigated, resource usage can be increased, and a system capacity can be increased.

Figure 1:
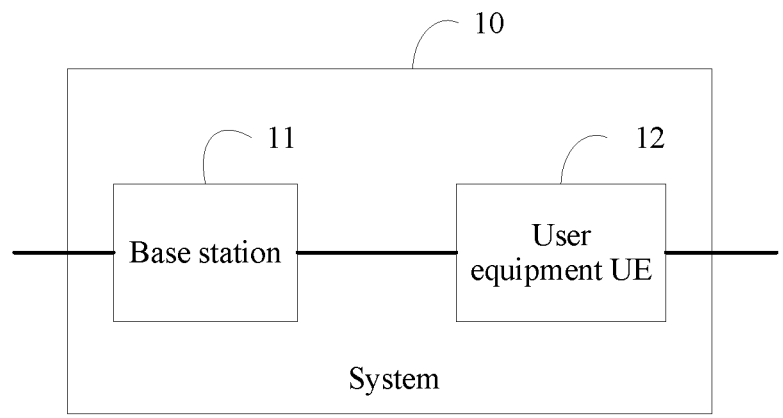
FIG. 1 is a diagram of a system architecture applied to this application.

This application is applicable to an LTE system, and particularly, is applicable to a scenario of processing much transmission that is of a small data packet and that requires a low delay. Certainly, the solution in this application may also be applied to 5G or another network. An example of a system architecture applied to this application is shown in FIG. 1. A system 10 includes a base station 11 and UE 12.

The base station 11 is configured to configure a resource request parameter, a PUSCH resource, and the like that are used by the UE 12. The UE 12 is configured to: send a resource request based on configuration of the base station 11, and transmit uplink data.

With reference to specific embodiments, the following describes in detail a transmission method, a transmission apparatus, a network device, and user equipment provided in this application.

Embodiment 1

Figure 2:
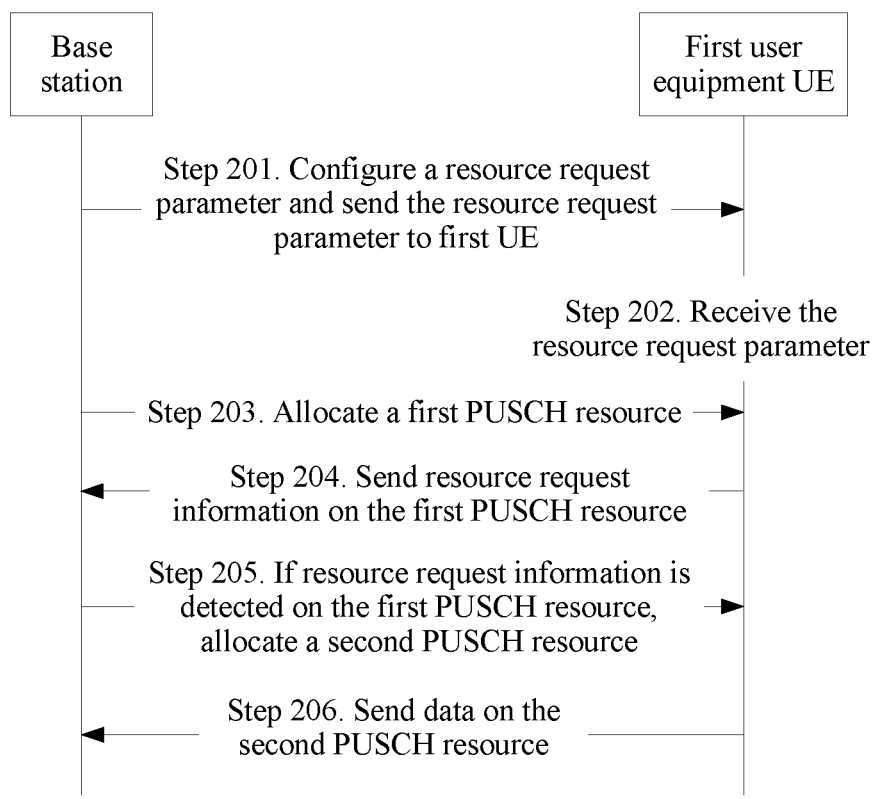
FIG. 2 is a flowchart of a transmission method according to Embodiment 1 of this application.

Referring to FIG. 2, a procedure of a transmission method provided in Embodiment 1 of this application is described as follows. In Embodiment 1, an example in which a base station schedules first UE is used for description, and the method provided in Embodiment 1 of this application is applicable to any scheduling scenario.

For example, a possible scheduling scenario is as follows: The base station has allocated an SPS resource to the first UE, and the SPS resource may be a contention resource shared by the first UE and another UE. It is assumed that UE that shares, with the first UE, an SPS resource for contention is referred to as contention UE.

Step 201: The base station configures a resource request parameter for the first UE, and sends the resource request parameter to the first UE.

The base station sends PDCCH information to the first UE, and the base station indicates that the sent PDCCH information is application resource indication information. The application resource indication information includes the resource request parameter, and is used for instructing the first UE to send resource request information based on the resource request parameter.

The resource request parameter includes one or more of a cyclic shift value, a time-frequency resource location, a resource request period, and an orthogonal cover code (OCC).

The cyclic shift value is used to distinguish between channel estimation results of the first UE and another UE in time domain when the first UE and the another UE jointly occupy a PUSCH resource.

The time-frequency resource location is used to indicate a time-frequency resource location occupied when the first UE sends resource request information. In an example manner, the base station configures, for the first UE, a pilot symbol that is of a PUSCH resource and that is occupied to send resource request information.

When scheduling the first UE, the base station may further send scheduling information to non-contention UE.

Step 202: The first UE receives the resource request parameter configured by the base station.

Step 203: The base station allocates a first PUSCH resource to the first UE, where the first PUSCH resource is used by the first UE to send resource request information.

Specifically, a pilot symbol of the first PUSCH resource is used by the first UE to send resource request information.

If the base station has allocated an SPS resource for contention to the first UE, the first PUSCH resource that is allocated by the base station to the first UE and that is used for sending resource request information may be the SPS resource, or may be a PUSCH resource used by the non-contention UE.

A manner in which the base station allocates the first PUSCH resource to the first UE may include but is not limited to the following two manners.

Manner 1

The base station sends a UL-grant message to the first UE. For ease of description, the UL-grant message herein is referred to as a first UL-grant message, and the first UL-grant message includes information about the first PUSCH resource allocated to the first UE.

Manner 2

The base station notifies PUSCH scheduling information of second UE to the first UE, where the PUSCH scheduling information of the second UE includes information about a third PUSCH resource that is allocated by the base station to the second UE and that is used for sending data; and instructs the first UE to use the third PUSCH resource as the first PUSCH resource that is used by the first UE to send resource request information.

As described in step 201, the base station may schedule the non-contention UE while sending scheduling information that includes the resource request parameter to the first UE. For ease of description, the non-contention UE herein is referred to as second UE.

When allocating the first PUSCH resource to the first UE, the base station may send, to the first UE, a value of a radio network temporary identifier (RNTI) used by the second UE to search for PDCCH information, so that the first UE obtains the PUSCH scheduling information of the second UE based on the RNTI used by the second UE, that is, the first UE can obtain scheduling information such as a time-frequency resource location, an OCC code, and a cyclic shift value of the third PUSCH of the second UE. The RNTI may be but is not limited to a cell RNTI (C-RNTI), a semi-persistent scheduling C-RNTI, or a temporary C-RNTI. Certainly, the base station may alternatively directly notify, to the first UE, the time-frequency resource location of the third PUSCH of the second UE by using the resource request parameter sent to the first UE.

Optionally, the base station instructs the first UE to occupy a pilot symbol of the third PUSCH resource of the second UE, to send resource request information.

In addition, the base station configures different cyclic shift values for the first UE and the second UE, so that the first UE and the second UE occupy the third PUSCH resource at different times by using the different cyclic shift values.

Step 204: The first UE determines the first PUSCH resource allocated by the base station, and sends resource request information to the base station on the first PUSCH resource based on the resource request parameter.

Specifically, the first UE sends resource request information to the base station on the pilot symbol of the first PUSCH resource based on the resource request parameter.

The first UE determines, based on the received first uplink scheduling grant UL-grant message sent by the base station, the first PUSCH resource allocated by the base station; or the first UE determines, based on the PUSCH scheduling information that is of the second UE and that is notified by the base station, the third PUSCH resource that is included in the PUSCH scheduling information of the second UE, allocated by the base station to the second UE, and used for sending data as the first PUSCH resource allocated by the base station. Specifically, the first UE obtains the PUSCH scheduling information of the second UE based on the received radio network temporary identifier RNTI that is sent by the base station and that is used by the second UE.

If the first UE needs to send data, the first UE sends, on the first PUSCH resource allocated by the base station, resource request information to the base station based on the resource request parameter before sending data.

If the first UE determines the third PUSCH resource as the first PUSCH resource, the first UE sends resource request information to the base station on the third PUSCH resource based on a cyclic shift value configured by the base station for the first UE.

Step 205: If the base station detects, on the first PUSCH resource, resource request information sent by the first UE based on the resource request parameter, the base station allocates, to the first UE, a second PUSCH resource used for sending data.

If the first UE sends resource request information on a pilot symbol of a PUSCH resource of the second UE, the base station detects, based on the different cyclic shift values allocated to the first UE and the second UE, resource request information sent by the first UE. After detecting resource request information sent by the first UE, the base station determines that the first UE needs to send data, and allocates, to the first UE, the second PUSCH resource used for sending data. Herein a case in which the second PUSCH resource is allocated to the first UE may include but is not limited to the following cases.

1. If the base station pre-allocates a common uplink SPS resource to the first UE and at least one third UE, detects resource request information separately sent by the first UE and the at least one third UE, and determines that both the first UE and the at least one third UE need to send data on the common uplink SPS resource, the base station allocates a PUSCH resource that is different from a PUSCH resource used by the at least one third UE to the first UE, and uses the PUSCH resource as the second PUSCH resource used by the first UE to send data.

The uplink SPS resource is a contention resource, and the third UE is contention UE that shares the contention resource with the first UE. The base station has allocated the contention resource to the first UE and the at least one third UE. If the base station detects that both the first UE and the at least one third UE have sent resource request information, both the first UE and the at least one third UE need to send data on the contention resource. Apparently, if no processing is performed, a conflict occurs between the first UE and the at least one third UE, and the contention resource is wasted. In this application, in this case, that different PUSCH resources are allocated to the first UE and the at least one third UE includes: sending dedicated scheduling to the at least one third UE, so that the at least one third UE sends data on the dedicated scheduling resource, and the first UE can continue to send data by using the contention resource; or sending dedicated scheduling to the first UE, so that the first UE sends data on the dedicated scheduling resource. In summary, the base station allocates, to the first UE, a PUSCH resource that is different from that of the at least one third UE, so as to effectively avoid a conflict caused when the first UE and the at least one third UE send data.

2. If the base station pre-allocates a common uplink SPS resource to the first UE and at least one third UE, detects resource request information separately sent by the first UE and the at least one third UE, and determines that both the first UE and the at least one third UE need to send data on the common uplink SPS resource, the base station indicates time resources on which the first UE and the at least one third UE separately occupy the uplink SPS resource, and the base station uses, as the second PUSCH resource that is allocated to the first UE and that is used for sending data, the uplink SPS resource occupied by the first UE on an indicated time resource.

In addition to the first scheduling method, this application provides the second method for avoiding a conflict between contention UEs. A basic idea is that both the first UE and the at least one third UE send data by using the contention resource, but occupy different time resources of the contention resource, for example, occupy different data symbols. In this way, a conflict between a plurality of contention UEs can be avoided.

Specifically, the base station sends a second UL-grant message to the first UE. The second UL-grant message carries indication information, and the indication information is used to indicate the time resource on which the first UE occupies the uplink SPS resource. Certainly, the base station also sends a UL-grant message to the at least one third UE, to indicate a time resource on which the uplink SPS resource is occupied. The time resource occupied by the first UE is apparently different from that occupied by the at least one third UE.

The base station may mark, based on a mapping relationship between a bit that can be multiplexed in the second UL-grant message and a time resource of the uplink SPS resource, the indication information in a bit that is corresponding to the time resource allocated to the first UE and that is in the bit that can be multiplexed.

3. If the base station pre-allocates a common uplink SPS resource to the first UE and at least one third UE, detects only resource request information sent by the first UE, and detects no resource request information sent by the at least one third UE, it indicates that the first UE has no contention user in a next sending subframe. In this case, the base station may not send, to the first UE, information about reallocating the second PUSCH resource, and the first UE occupies the uplink SPS resource in the next sending subframe to send data.

Step 206: The first UE determines the second PUSCH resource that is allocated by the base station and that is used for sending data, and sends data on the second PUSCH resource.

Specifically, the first UE determines, based on a received instruction sent by the base station, that the instruction includes information about the second PUSCH resource; and sends data on the second PUSCH resource based on the instruction.

If the first UE knows an uplink SPS resource that is allocated by the base station to the first UE and that is used for sending data, the first UE receives the second UL-grant message sent by the base station; determines, based on the indication information marked in the bit that can be multiplexed in the second UL-grant message and the mapping relationship between the bit that can be multiplexed and a time resource of the uplink SPS resource, the time resource that is allocated by the base station to the first UE and that is occupied on the uplink SPS resource; and sends data on the time resource occupied on the uplink SPS resource.

The first UE sends data on the uplink SPS resource if the first UE knows the uplink SPS resource that is allocated by the base station to the first UE and that is used for sending data, and receives, after sending resource request information to the base station, no information about the second PUSCH resource that is allocated by the base station and that is used for sending data.

With reference to a specific application scenario, the following further describes in detail the method provided in Embodiment 1 of this application. The following "user" is conceptually equivalent to "UE".

Figure 3:
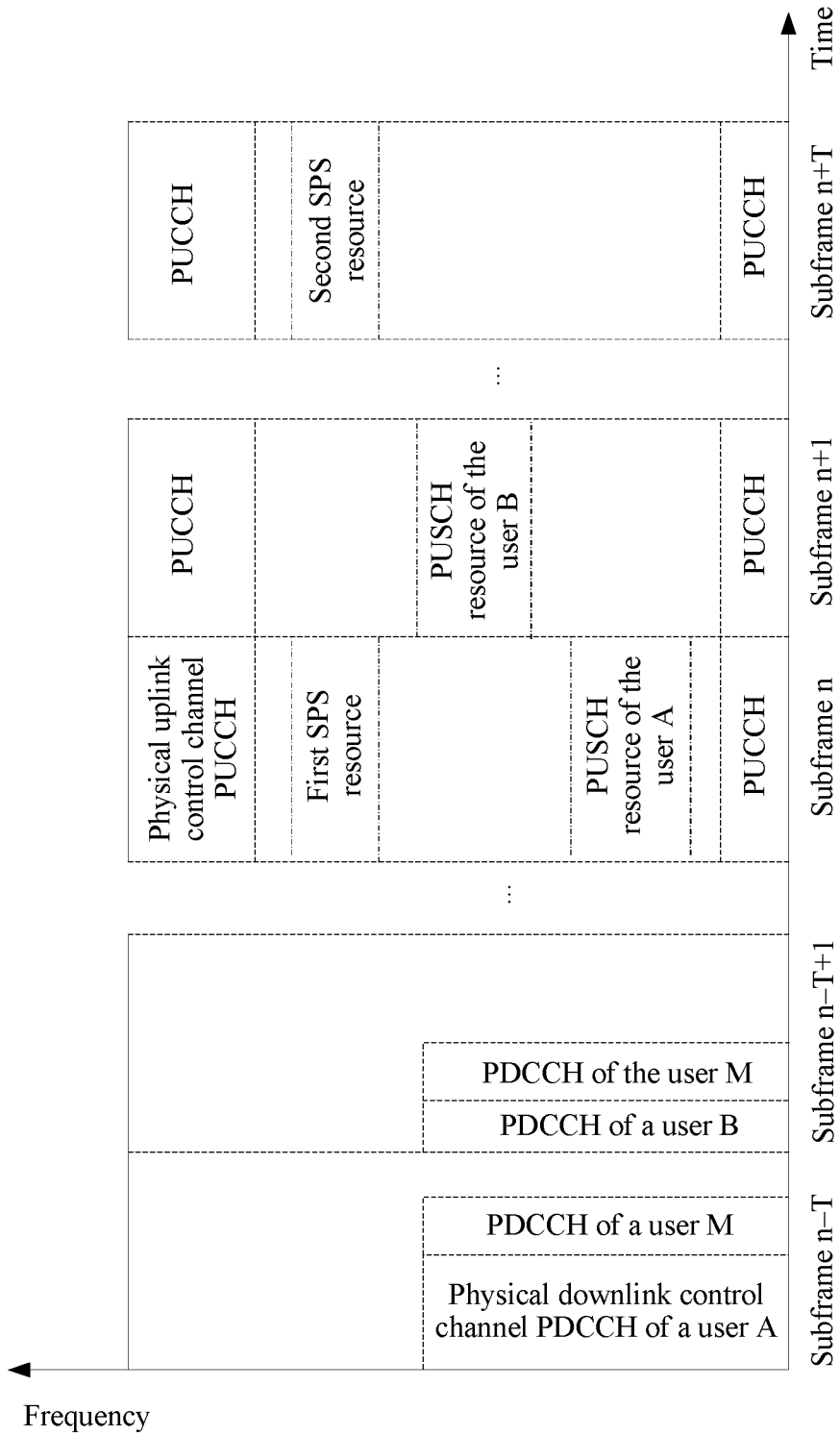
FIG. 3 is a schematic diagram of scheduling UE by a base station according to this application.

Referring to FIG. 3, it is assumed that the base station has allocated an SPS resource for contention to at least one user that includes a user M, and an SPS period is T. It is assumed that an SPS resource of the user M in a subframe n is referred to as a first SPS resource, and an SPS resource of the user M in a subframe n+T is referred to as a second SPS resource.

The base station sends scheduling information to the user M and a user A in a subframe n−T. The user A is any non-contention user. To be specific, the user A does not contend for the SPS resource with the user M.

The base station adds PUSCH resource information to be used by the user A in the subframe n to PDCCH information of the user A, and a parameter of a PUSCH resource configured by the base station for the user A is {frequency-domain location: RB 10 to RB 20; OCC=NULL; and cyclic shift value=0}.

The base station notifies, in PDCCH information of the user M, the user M that the PDCCH information is application resource indication information. The PDCCH information carries a resource request parameter, and the resource request parameter includes at least any one of the following: an OCC code, a cyclic shift value, and a used time-frequency resource location. Optionally, an RNTI of the user A may also be included in the PDCCH information. For example, the resource request parameter added by the base station to the PDCCH of the user M is {OCC=NULL; cyclic shift value=6; and used pilot symbol: 10}.

In this case, the user M may obtain the PUSCH resource information of the user A from a network side based on the RNTI of the user A, and learn that PUSCH frequency-domain resources of the user A are the RB 10 to the RB 20. Therefore, the resource request parameter used by the user M to send resource request information in the subframe n is {frequency-domain location: RB 10 to RB 20; OCC=NULL; cyclic shift value=6; and used pilot symbol: 10}, and the user M sends a reference signal on the pilot symbol 10 of the subframe n and on the PUSCH frequency-domain resources: the RB 10 to the RB 20 of the user A based on the cyclic shift value of the user M in a code division manner. The reference signal is used as resource request information.

Likewise, the base station may also send, in a subframe n−T+1, scheduling information to the user M and a user B, and the user B is any non-contention user. The user M may send, in a subframe n+1 on a PUSCH resource of the user B, a reference signal based on a cyclic shift value of the user M in a code division manner, and the reference signal is used as resource request information. The same part is not described herein again.

The base station detects, in the subframe n on the PUSCH resource of the user A, whether the user M has sent resource request information, and specifically, performs detection based on different cyclic shift values of the user A and the user M. If the base station detects that the user M has sent resource request information, the base station determines that the user M is to send data in the subframe n+T on a subsequent first SPS resource (namely, the second SPS resource) allocated to the user M.

If the base station also detects that another user sharing the contention resource with the user A has also sent a resource request message to request to send data on the second SPS resource, the base station allocates different transmission resources to the user A and the another user who contends with the user A. A specific allocation method is described in Embodiment 1, and details are not described herein again.

According to Embodiment 1 provided in this application, the base station allocates, to the first UE, the first PUSCH resource used for sending resource request information, and allocates, to the first UE after receiving resource request information of the first UE, the second PUSCH resource used for sending data. In this way, the first UE can occupy a PUSCH resource allocated to any UE, to send resource request information, so that PUCCH capacity limitation is effectively mitigated, and more UEs can send resource requests. In addition, a problem of a conflict between UEs in a contention-based semi-persistent scheduling process can be resolved, so that PUSCH resources are more effectively used, and an uplink transmission delay is reduced. In conclusion, resource usage in an uplink transmission process can be increased, and a system capacity can be increased.

Embodiment 2

Considering that in an existing contention-based uplink transmission solution, a conflict occurs when a plurality of UEs use a contention resource, and a base station cannot detect information about any UE, and consequently, transmission resources are wasted and a transmission delay is increased, based on a same inventive concept as Embodiment 1, the method in Embodiment 1 is applied to a specific contention scenario in Embodiment 2 of this application, and the method provided in Embodiment 1 is further described in detail. A main idea is to determine in advance whether a conflict occurs on a contention resource and allocate different transmission resources to conflicting UEs if the conflict occurs, so that a conflict can be avoided on the contention resource, and a series of problems such as a resource waste and a delay increase that are caused due to a conflict can be avoided.

With reference to the accompanying drawings, the following describes in detail a transmission method provided in Embodiment 2 of this application.

Figure 4:
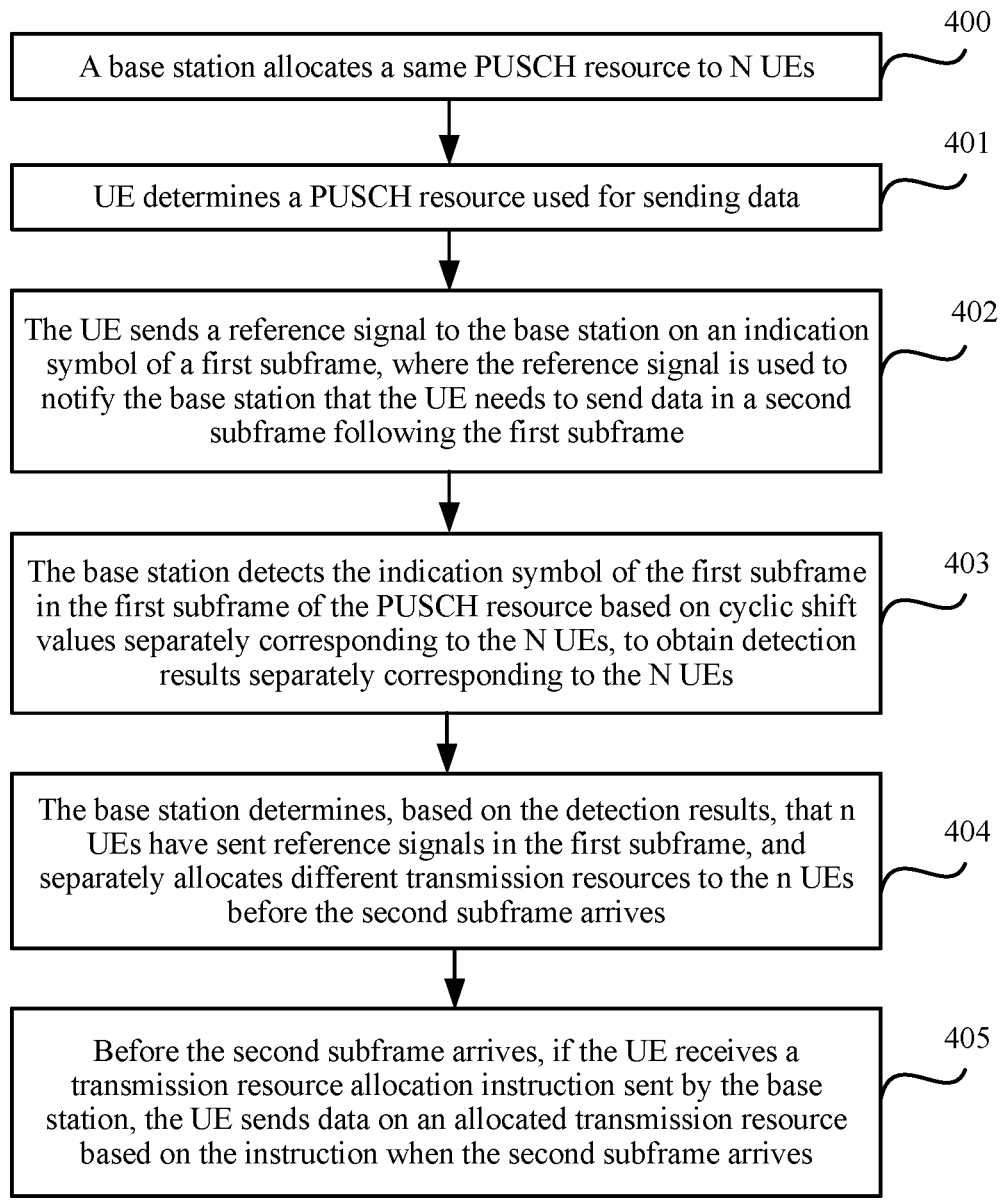
FIG. 4 is a flowchart of a transmission method according to Embodiment 2 of this application.

Referring to FIG. 4, a specific procedure of the transmission method provided in this application is described as follows.

Step 400: A base station allocates a same physical uplink shared channel PUSCH resource to N UEs, where N≥2, and N is a positive integer.

In Embodiment 2 of this application, the base station periodically allocates a same PUSCH resource to UEs through SPS. It is assumed that there are N UEs, and the same PUSCH resource is a contention resource that is used by the N UEs to transmit uplink data. That is, each of the N UEs can send uplink data on the same PUSCH resource.

In a process of establishing an RRC connection to each scheduled UE, the base station completes SPS configuration by using an RRC message, where the SPS configuration includes an SPS period; and sends an SPS activation message by using a PDCCH, to activate the SPS configuration. A location of the PUSCH resource allocated to the UE is indicated in the SPS activation message. To configure the same PUSCH resource for the N UEs, a separate PDCCH resource may be allocated to each of the N UEs, and the same PUSCH resource is indicated in the separate PDCCH resource. Alternatively, a group RNTI, namely, a contention-based RNTI (CB-RNTI) may be configured for the N UEs, and the N UEs search for a PDCCH message based on the same CB-RNTI, so as to obtain the same PUSCH resource.

The base station allocates a PUSCH resource at intervals based on the SPS period. In one subframe, only one UE may be to send data, or no UE may be to send data, or at least two UEs may be to send data. When at least two UEs are to send data, a conflict occurs in the subframe. In Embodiment 2 of this application, a quantity of UEs that are to send data in the subframe needs to be determined before the subframe arrives.

Based on this concept, one symbol of a subframe is used as an indication symbol in Embodiment 2 of this application, the indication symbol is used by the UE to send a reference signal, the reference signal is used to notify the base station that the UE needs to send data in a next subframe, and an interval between the next subframe and the subframe used for sending the reference signal is the SPS period.

It should be noted that in Embodiment 2 of this application, the SPS period may be a fixed period, or may be an unfixed period.

Optionally, the indication symbol is a pilot symbol.

Figure 5:
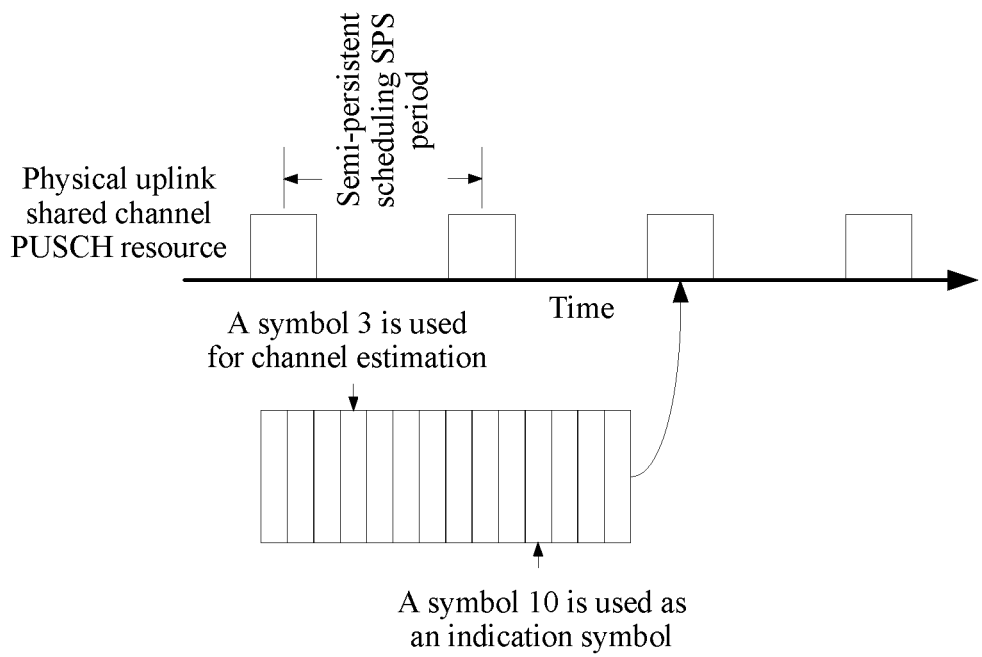
FIG. 5 is a schematic diagram of resource allocation according to this application.

Referring to FIG. 5, FIG. 5 is a schematic diagram of periodic allocation of a PUSCH resource and a schematic diagram of allocation of an indication symbol. A conventional cycle prefix (CP) subframe structure is used as an example. One subframe includes 14 symbols, a symbol 3 in a slot 0 and a symbol 10 in a slot 1 are pilot symbols, and other symbols are data symbols. In this application, one of the pilot symbols is selected as an indication symbol, for example, the symbol 10 is selected as the indication symbol, and is used by the UE to send a reference signal indicating that data needs to be sent in a next subframe. The symbol 3 is still used as a pilot symbol for channel estimation.

As the indication symbol, the symbol 10 may be used for separately sending. To be specific, when the UE does not send data on a data symbol of a current subframe, the UE may separately send the reference signal on the indication symbol. When a plurality of UEs simultaneously send reference signals in the current subframe, a cyclic shift value is allocated to each of the N UEs to detect a plurality of reference signals in Embodiment 2 of this application.

In a process of scheduling each UE, the base station needs to notify a corresponding cyclic shift value and notify a location of the indication symbol in the subframe to each of the N UEs.

Specifically, the base station notifies, by using an RRC message, the corresponding cyclic shift value and the location of the indication symbol in the subframe to each UE. The base station may directly notify the corresponding cyclic shift value to each UE; or notify an index value according to Table 5.5.2.1.1-1 in the 3GPP TS36.211 protocol to the UE, and the UE obtains the finally used cyclic shift value based on the index value. When notifying the location of the indication symbol in the subframe, the base station may notify a slot location to the UE, such as the slot 0 or the slot 1, of the indication symbol, or may notify a symbol index to the UE, for example, in a case of a conventional CP, the base station notifies the UE that the indication symbol is a symbol 3 or a symbol 10, or in a case of an extended CP, the base station notifies the UE that the indication symbol is a symbol 2 or a symbol 8.

Step 401: UE determines a PUSCH resource used for sending data, where the PUSCH resource is multiplexed by at least two UEs.

Specifically, the UE is any one of the N UEs scheduled by the base station. Based on allocation of the base station in step 400, the UE determines the PUSCH resource used for sending uplink data, and the PUSCH resource is a contention resource used by the N UEs to send data. In addition, based on the allocation of the base station in step 400, the UE determines the location of the indication symbol in the subframe and a cyclic shift value corresponding to the UE.

Step 402: The UE sends a reference signal to the base station on an indication symbol of a first subframe, where the reference signal is used to notify the base station that the UE needs to send data in a second subframe following the first subframe.

Two adjacent sending subframes of the PUSCH resource are used as an example for description, and are respectively referred to as a first subframe and a second subframe, an interval between the first subframe and the second subframe is an SPS period, and the SPS period is a fixed period or an unfixed period. The indication symbol is used by the UE to send the reference signal notifying the base station that the UE needs to send data in the second subframe. The indication symbol is a pilot symbol of the first subframe.

Specifically, the UE sends the reference signal to the base station on the pilot symbol of the first subframe based on the cyclic shift value corresponding to the UE.

Step 403: The base station detects the indication symbol of the first subframe in the first subframe of the PUSCH resource based on cyclic shift values separately corresponding to the N UEs, to obtain detection results separately corresponding to the N UEs.

Specifically, the base station separately performs detection on a location of a pilot symbol of the first subframe based on the cyclic shift values corresponding to the N UEs, to obtain channel estimation results separately corresponding to the N UEs.

Figure 6:
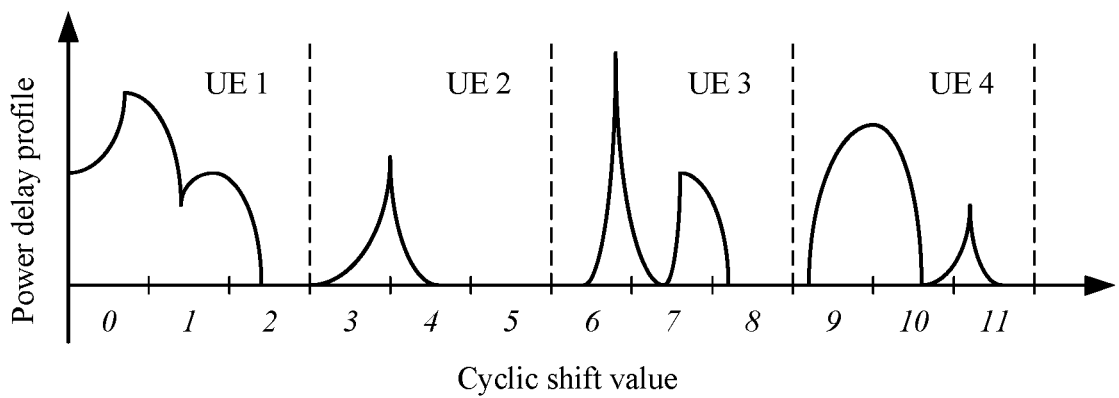
FIG. 6 is a schematic diagram of channel estimation results corresponding to different cyclic shift values according to this application.

After the base station allocates the different cyclic shift values to the N UEs, the different cyclic shift values represent time offsets of the channel estimation results in time domain during channel estimation. Therefore, the channel estimation results of the N UEs are not overlapped in time domain. As shown in FIG. 6, FIG. 6 is a schematic diagram of obtaining a channel estimation result by a base station. In FIG. 6, for example, N=4. The base station allocates a same reference signal transmission resource and different cyclic shift values to four UEs: UE 1, UE 2, UE 3, and UE 4. It is assumed that the cyclic shift values of the UE 1, the UE 2, the UE 3, and the UE 4 are respectively 0, 3, 6, and 9. When all the four UEs send reference signals on the indication symbol of the first subframe, because the cyclic shift values of the four UEs are different, channel estimation results of the four UEs are differently displayed in time domain, in other words, channel power delay profiles are separated. The base station performs energy detection on a channel estimation result on a detection window corresponding to a cyclic shift value of each UE, to obtain a detection result of each UE, to be specific, learn whether each UE has sent a reference signal on the indication symbol.

Step 404: The base station determines, based on the detection results, that n UEs have sent reference signals in the first subframe, and separately allocates different transmission resources to the n UEs before the second subframe arrives, where 2≤n≤N, and n is a positive integer.

The base station determines, based on the channel estimation result on the detection window corresponding to the cyclic shift value of each UE, UE that has sent a reference signal on the indication symbol of the first subframe. It is assumed that there are n UEs, and n is a positive integer. Certainly, when n=1, that is, when only one UE has sent a reference signal on the indication symbol of the first subframe, it indicates that only one UE is to send data in the second subframe following the first subframe, and no conflict occurs. In Embodiment 2 of this application, if n=1, the base station does not perform subsequent processing. When 2≤n≤N, that is, when at least two UEs have sent reference signals on the indication symbol of the first subframe, it indicates that the at least two UEs are to send data in the second subframe following the first subframe, and a conflict occurs. In Embodiment 2 of this application, the base station allocates different transmission resources to the n UEs before the second subframe arrives.

A specific method for allocating different transmission resources may be but is not limited to the following two methods.

Method 1

Before the second subframe arrives, n−1 UEs are selected from the n UEs, and other PUSCH resources different from the PUSCH resource are separately allocated to the n−1 UEs.

In the first allocation method, the base station selects one UE from the n UEs to continue to transmit data by using the pre-allocated same PUSCH resource (namely, a contention resource), and sends dedicated scheduling to the other n−1 UEs, for example, sends a UL-grant to the other n−1 UEs. A location of a dedicated PUSCH resource of the UE is indicated in the UL-grant, and the location of the dedicated PUSCH resource is different from a location of the same PUSCH resource.

Method 2

Indication information is separately sent to the n UEs before the second subframe arrives. The indication information is used to indicate a data symbol occupied when the UE sends data in the second subframe on the PUSCH resource.

One UE occupies at least one data symbol, and a total quantity of data symbols occupied by the n UEs is not greater than a total quantity of available data symbols of the second subframe.

After determining that a sending conflict occurs between the n UEs in the second subframe, the base station may not allocate other PUSCH resources, but may specifically allocate, on the same PUSCH resource, a symbol resource of the second subframe in time domain to each user for use. In this way, although each UE still transmits data in a same subframe, a conflict is avoided due to separation in time domain.

Specifically, the base station allocates available data symbols of the second subframe to the n UEs for use, and may allocate the data symbols to the UEs on average, or may allocate, based on measurement reports of the UEs and transmission requirements of the UEs, the data symbols to the UEs for use.

A manner of sending the indication information to any one of the n UEs by the base station may be but is not limited to the following manner:

The base station sends an uplink scheduling grant UL-grant message to any UE; selects, from a bit that can be multiplexed in the UL-grant message and based on a mapping relationship between the bit that can be multiplexed and a data symbol of the second subframe, a bit corresponding to a data symbol allocated to any UE; and marks the indication information in the selected bit.

For example, a structure of the UL-grant message is: a hopping flag occupying 1 bit, a resource block allocation indication (Fixed size resource block assignment) occupying 10 bits, a modulation/demodulation scheme indication (Truncated modulation and coding scheme) occupying 4 bits, a power control indication (TPC command for scheduled PUSCH) occupying 3 bits, an uplink delay sending indication (UL delay) occupying 1 bit, and a channel state information request indication (CSI request) occupying 1 bit.

Because in an SPS scenario, the UE knows a resource block location of the PUSCH resource, the 10 bits occupied by the resource block allocation indication may be multiplexed. Because the hopping flag, the uplink delay sending indication, and the channel state information request indication are not mandatory indications, any two bits may be selected for multiplexing.

In this case, 12 bits may be selected in the UL-grant message to respectively represent 12 data symbol indexes, and indication information indicating whether a mapped data symbol is available is marked in the 12 bits. It is assumed that 1 indicates that a data symbol is available, and 0 indicates that a data symbol is unavailable. For example, the 12 bits are numbered by 0, 1, 2, . . . , and 11, and are respectively mapped to data symbols 0, 1, 2, 4 to 9, 11, 12, and 13 in a conventional CP frame structure. If indication information marked in a location of the bit 2 is 0, it indicates that the data symbol 2 is unavailable; or if indication information marked in a location of the bit 5 is 1, it indicates that the data symbol 6 is available.

Therefore, the base station sends the UL-grant message to the UE, to indicate a data symbol that can be occupied by the UE to transmit data in the second subframe.

Step 405: Before the second subframe arrives, if the UE receives a transmission resource allocation instruction sent by the base station, the UE sends data on an allocated transmission resource based on the instruction when the second subframe arrives.

If the base station allocates the different transmission resources to the n UEs in step 404, in this step, the UE receives the transmission resource allocation instruction sent by the base station.

Specifically, based on the two manners of allocating different transmission resources by the base station in step 404, in this step, before the second subframe arrives, if the UE receives an instruction that is sent by the base station and that is used for performing scheduling to another PUSCH resource different from the PUSCH resource, the UE sends data on the another PUSCH resource based on the instruction when the second subframe arrives; or before the second subframe arrives, if the UE receives indication information sent by the base station, the UE sends, on the PUSCH resource based on the indication information when the second subframe arrives, data on a data symbol that is of the second subframe and that is corresponding to the UE.

The UE receives the uplink scheduling grant UL-grant message sent by the base station; determines, based on indication information marked in a bit that can be multiplexed in the UL-grant message and a mapping relationship between the bit that can be multiplexed and a data symbol of the second subframe, the data symbol corresponding to the UE; and sends data on the determined data symbol of the second subframe on the PUSCH resource.

With reference to a specific application scenario, the following further describes in detail the transmission method provided in FIG. 4. The first method for allocating different transmission resources is used as an example.

As shown in FIG. 7, in an SPS scenario, it is assumed that an SPS period is fixed, and is 4 s. Four UEs scheduled through SPS are respectively UE 1, UE 2, UE 3, and UE 4. After SPS configuration is activated, the UE 1 has separately sent data in a subframe n. The UE 2 and the UE 3 need to send data in a next subframe n+4, but the UE 1 does not need to send data in the subframe n+4. In this case, the UE 2 and the UE 3 send reference signals on an indication symbol of the subframe n, to notify the base station that the UE 2 and the UE 3 need to send data in the subframe n+4. The base station detects, in the subframe n, the indication symbol based on a cyclic shift value corresponding to each UE, and determines that the UE 2 and the UE 3 have sent reference signals. Therefore, it can be determined that a conflict occurs in the subframe n+4. In this case, the base station sends a UL-grant message to the UE 2 in a subframe n+2, to indicate a dedicated scheduling resource of the UE 2. After receiving the UL-grant message, the UE 2 sends data on the dedicated scheduling resource indicated by the base station. In this way, a conflict caused when the UE 2 and the UE 3 send data in the subframe n+4 can be avoided.

So far, the communication method provided in Embodiment 2 of this application is described, and the transmission method shown in FIG. 4 is applicable to the SPS scenario. The base station periodically allocates a same PUSCH resource to a plurality of UEs, and monitors, on an indication symbol of a current subframe, a quantity of UEs that need to send data in a next subframe. Once the base station determines that a conflict occurs in the next subframe, the base station pre-allocates different transmission resources to conflicting UEs, so that a conflict caused when a plurality of UEs simultaneously use a PUSCH resource can be effectively avoided, resource usage can be increased, and a problem of a transmission delay increase caused due to a conflict can be resolved. When the UE needs to send data in the next subframe, the UE sends a reference signal on the indication symbol of the current subframe, to notify the base station that the UE needs to send data in the next subframe. If before the next subframe arrives, the UE receives dedicated scheduling sent by the base station, or receives indication information that is sent by the base station and that is used to instruct the UE to send data on a data symbol of the next subframe, the UE sends data in the next subframe based on the instruction of the base station. In this way, a conflict caused when the UE shares a same transmission resource with another UE can be avoided, uplink transmission can be more effective and efficient, and a transmission delay can be reduced.

Embodiment 3

Based on a same inventive concept as Embodiment 1 and Embodiment 2, another transmission method is further provided in Embodiment 3 of this application, and is applicable to not only an SPS scenario, but also a pre-scheduling scenario. A core idea of the method in Embodiment 3 of this application is as follows: Time resources of a PUSCH resource are divided, and the time resources are separately allocated to a plurality of scheduled UEs, so that the UE can send data only on a specified time resource of the PUSCH resource. Different cyclic shift values are separately allocated to the plurality of UEs. When the plurality of UEs send data on a same PUSCH resource, data of the plurality of UEs may be detected based on the different cyclic shift values, so as to effectively avoid a conflict caused when the plurality of UEs simultaneously use the same PUSCH resource.

Referring to FIG. 8, a specific procedure of the transmission method provided in Embodiment 3 of this application is described as follows.

Step 801: A base station allocates, to first UE, a PUSCH resource used for sending data, and the base station configures, for the first UE, a resource request parameter and a time resource occupied to send data on the PUSCH resource, and notifies the resource request parameter and the time resource to the first UE, where the first UE and at least one second UE share the PUSCH resource.

The resource request parameter includes a cyclic shift value and a time-frequency resource location.

Both the time resource occupied to send data on the PUSCH resource and a cyclic shift value that are of the first UE are different from those of the at least one second UE.

The base station notifies, to the first UE by using a radio resource control RRC message or an uplink scheduling grant UL-grant message, the resource request parameter and the time resource occupied to send data on the PUSCH resource.

Step 802: If the base station detects, on the PUSCH resource based on the resource request parameter configured for the first UE, resource request information sent by the first UE, the base station processes, on the time resource occupied by the first UE on the PUSCH resource, data sent by the first UE.

Embodiment 4

A concept of Embodiment 4 provided in this application is the same as that of Embodiment 3, and the method in Embodiment 3 is applied to a specific scenario, and is described in detail.

Figure 9:
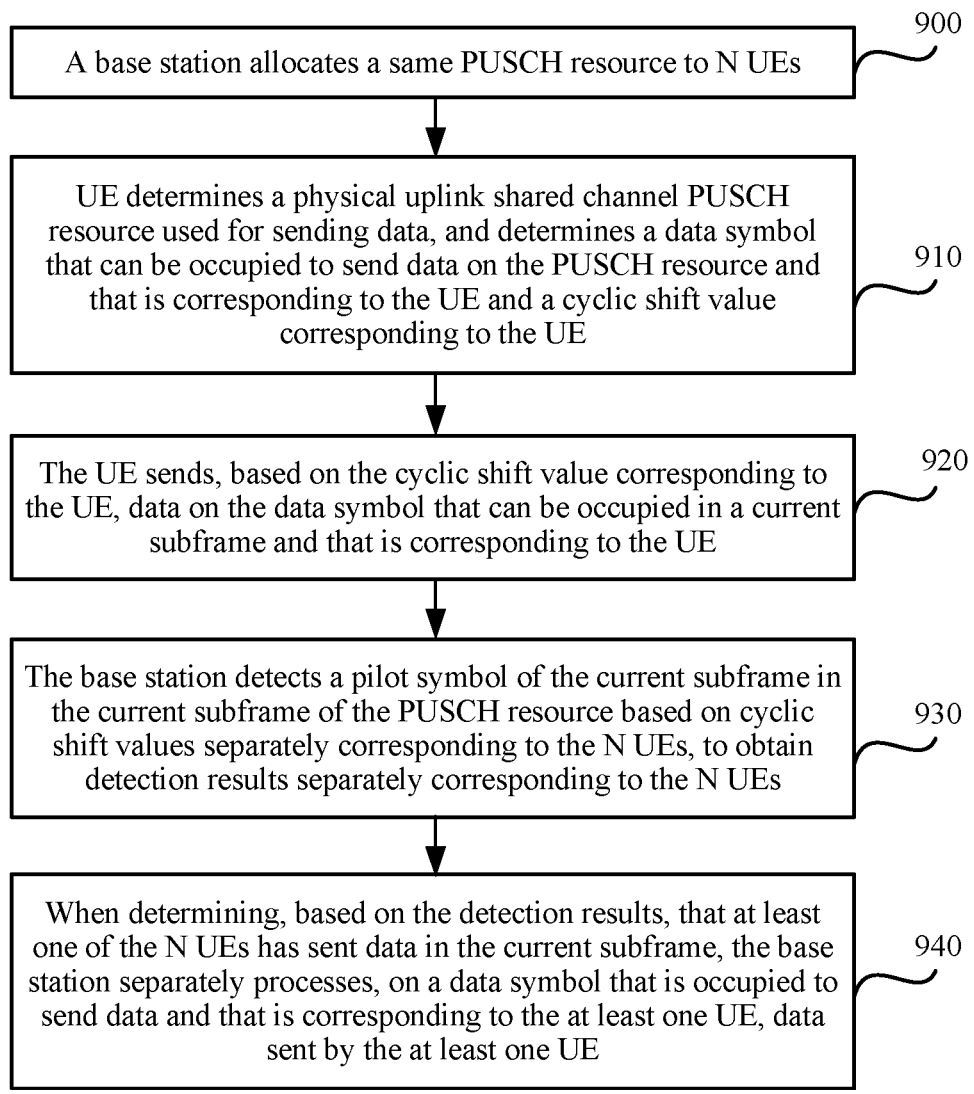
FIG. 9 is a flowchart of a transmission method according to Embodiment 4 of this application.

Referring to FIG. 9, a procedure of a transmission method provided in Embodiment 4 of this application is described as follows.

Step 900: A base station allocates a same physical uplink shared channel PUSCH resource to N UEs, where N≥2, and N is a positive integer.

A method for allocating the same PUSCH resource is the same as that described in the communication method shown in FIG. 2, and details are not described herein again.

In an SPS scenario, the base station completes SPS configuration by using an RRC message, and notifies a corresponding cyclic shift value and a corresponding available data symbol to each UE by using the RRC message; or may send an SPS activation message by using a PDCCH, to activate SPS configuration, and notify, in the SPS activation message, a corresponding cyclic shift value and a corresponding available data symbol to UE.

In a pre-scheduling scenario, the base station may notify a corresponding cyclic shift value and a corresponding available data symbol to each UE by using an RRC message. Then each UE enables a contention transmission mode by using a PDCCH message corresponding to a contention-dedicated CB-RNTI. The base station adds an enable flag to a separate pre-scheduling message, to enable a function of using only some data symbols. Alternatively, content of a UL-grant message may be extended, so that the UL-grant message includes the corresponding cyclic shift value and the corresponding available data symbol of the UE.

One UE occupies at least one data symbol, and a total quantity of data symbols occupied by the N UEs is not greater than a total quantity of available data symbols of a current subframe.

The foregoing notification manner is merely an example, and a notification manner is not specifically limited in Embodiment 4 of this application.

Step 910: UE determines a physical uplink shared channel PUSCH resource used for sending data, and determines a data symbol that can be occupied to send data on the PUSCH resource and that is corresponding to the UE and a cyclic shift value corresponding to the UE, where the PUSCH resource is multiplexed by at least two UEs.

Before sending data, the UE receives the PUSCH resource notified by the base station, the cyclic shift value corresponding to the UE, and the data symbol that can be occupied and that is corresponding to the UE.

Step 920: The UE sends, based on the cyclic shift value corresponding to the UE, data on the data symbol that can be occupied in a current subframe and that is corresponding to the UE.

When the UE needs to send data, the UE directly sends, in the current subframe on a latest available transmission resource based on the cyclic shift value corresponding to the UE, data on the data symbol that can be occupied and that is corresponding to the UE.

Step 930: The base station detects a pilot symbol of the current subframe in the current subframe of the PUSCH resource based on cyclic shift values separately corresponding to the N UEs, to obtain detection results separately corresponding to the N UEs.

Because the N UEs have different cyclic shift values, when a plurality of UEs send data, the base station can still distinguish between channel estimation results of the UEs, and determine whether the UEs have sent data.

Step 940: When determining, based on the detection results, that at least one of the N UEs has sent data in the current subframe, the base station separately processes, on a data symbol that is occupied to send data and that is corresponding to the at least one UE, data sent by the at least one UE.

After UEs that have sent data are determined, demodulation and decoding are performed on occupied data symbols that are separately corresponding to the UEs that have sent data.

Therefore, according to the methods in Embodiment 3 and Embodiment 4 of this application, although a plurality of UEs send data on a same PUSCH resource, a conflict can be avoided because the UEs occupy different data symbols. Further, because the UEs have different cyclic shift values, whether each UE has sent data may be accurately detected, and then demodulation and decoding are performed on a data symbol corresponding to the UE, so that a conflict caused when the plurality of UEs use a same PUSCH resource is avoided, uplink data transmission is more effective and efficient, and a transmission delay increase caused due to a conflict is avoided.

With reference to a specific application scenario, the following further describes in detail the transmission method shown in FIG. 9.

Figure 10:
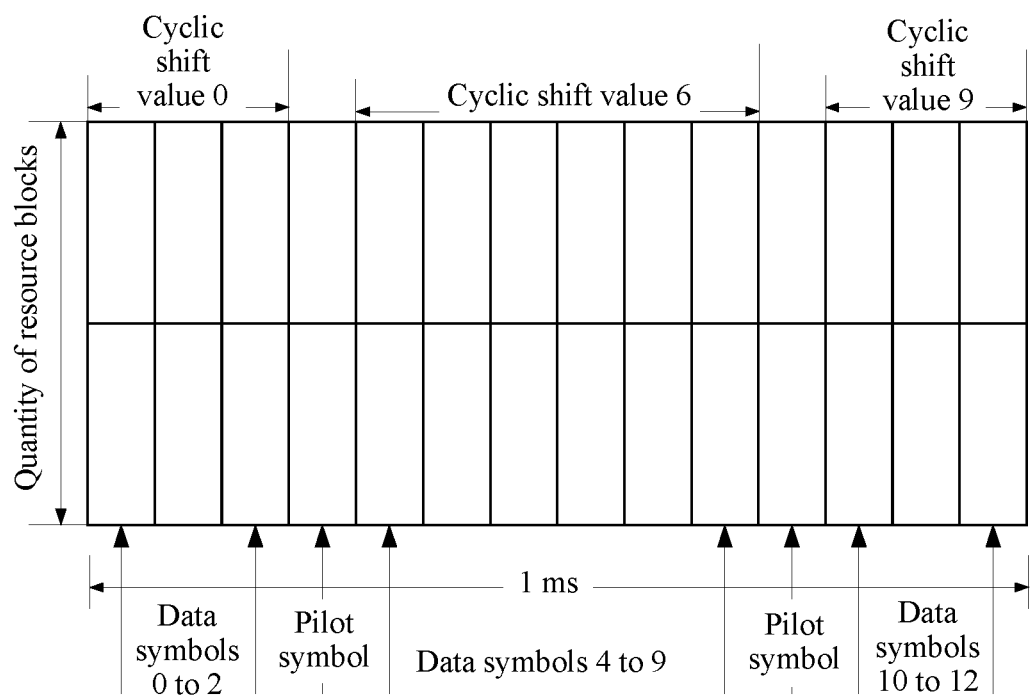
FIG. 10 is a schematic diagram of allocation of a cyclic shift value and a data symbol according to this application.

It is assumed that the method is applied to an SPS scenario. As shown in FIG. 10, a subframe in a case of a conventional CP is still used as an example. One subframe includes 14 symbols, a symbol 3 and a symbol 10 are used as pilot symbols, and other symbols are data symbols.

Different cyclic shift values and different available data symbols are allocated to three UEs (assuming that the three UEs are UE 1, UE 2, and UE 3) scheduled through SPS. A cyclic shift value 0 and available data symbols 0 to 2 are allocated to the UE 1, a cyclic shift value 6 and available data symbols 4 to 9 are allocated to the UE 2, and a cyclic shift value 9 and available data symbols 11 to 13 are allocated to the UE 3.

Figure 11:
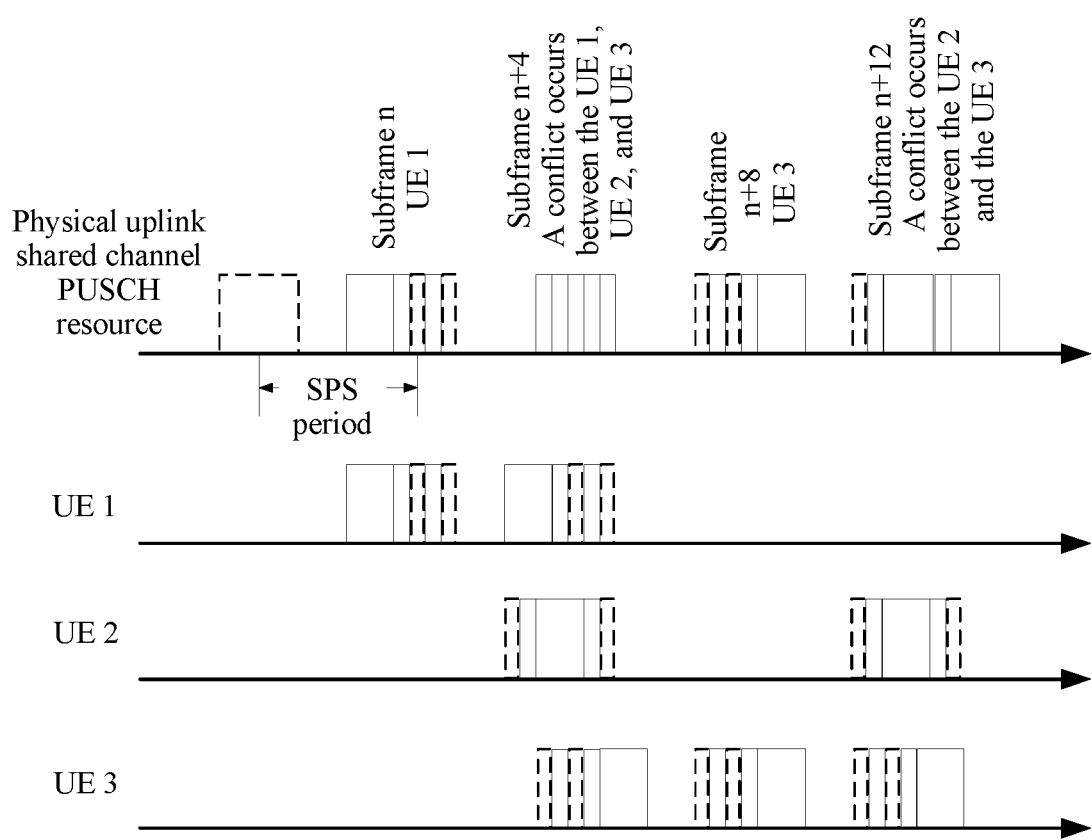
FIG. 11 is a schematic diagram of scheduling UE according to this application.

As shown in FIG. 11, in the SPS scenario, it is assumed that an SPS period is fixed, and is 4 s. After SPS configuration is activated, when the UE 1 needs to send data, the UE 1 directly sends data on an available data symbol that is of a latest subframe n and that is corresponding to the UE 1, that is, sends data on the data symbols 0 to 2. The base station detects a pilot symbol based on the different cyclic shift values of the UEs, to determine that the UE 1 has sent data, and performs demodulation and decoding on the data symbols 0 to 2 corresponding to the UE 1.

If all the UE 1, the UE 2, and the UE 3 need to send data in a next sending subframe n+4, the UE 1 sends data on the data symbols 0 to 2 corresponding to the UE 1, the UE 2 sends data on the data symbols 4 to 9 corresponding to the UE 2, and the UE 3 sends data on the data symbols 11 to 13 corresponding to the UE 3. The base station detects the pilot symbol based on the different cyclic shift values of the UEs, to determine that all the three UEs have sent data, and performs demodulation and decoding on the data symbols separately corresponding to the three UEs.

Likewise, principles of separately sending data by the UE 3 in a subframe n+8 and sending data by the UE 2 and the UE 3 in a subframe n+12 are the same, and details are not described herein again.

Figure 12:
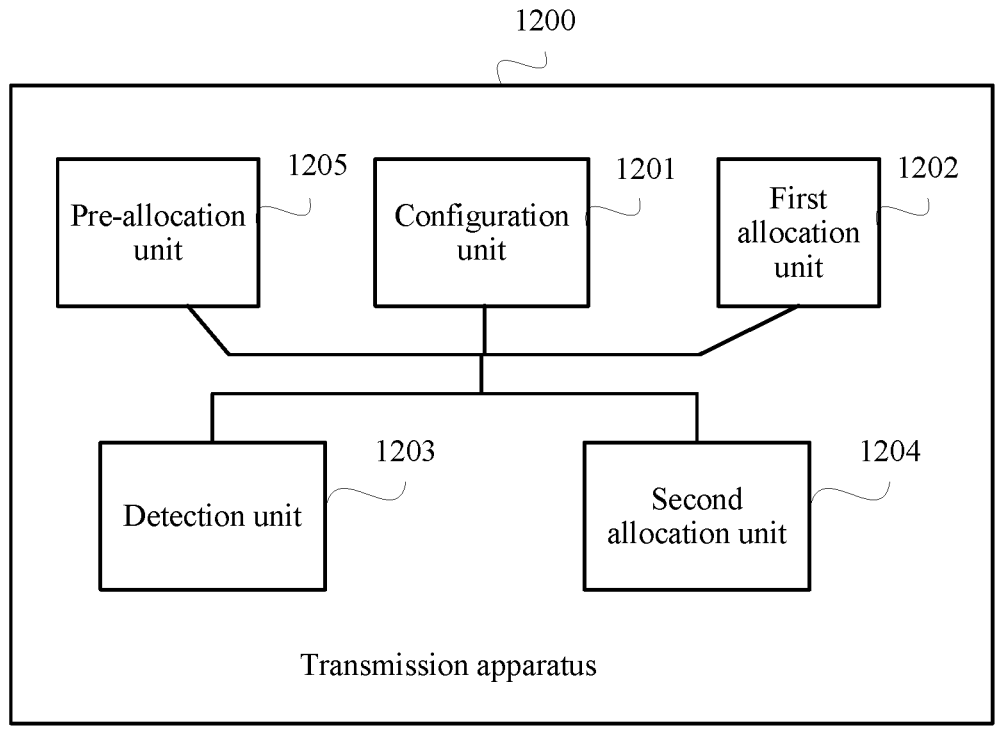
FIG. 12 to FIG. 14 are schematic structural diagrams of a transmission apparatus according to this application.

Based on a same inventive concept, referring to FIG. 12, this application further provides a transmission apparatus 1200, configured to perform the transmission method provided in this application. The transmission apparatus 1200 includes a configuration unit 1201, a first allocation unit 1202, a detection unit 1203, a second allocation unit 1204, and a pre-allocation unit 1205.

The configuration unit 1201 is configures a resource request parameter for first user equipment UE, and send the resource request parameter to the first UE.

The first allocation unit 1202 is configured to allocate a first physical uplink shared channel PUSCH resource to the first UE, where the first PUSCH resource is used by the first UE to send resource request information.

The detection unit 1203 is configured to detect, on the first PUSCH resource, resource request information sent by the first UE based on the resource request parameter.

The second allocation unit 1204 is configured to: when the detection unit detects, on the first PUSCH resource, the resource request information sent by the first UE based on the resource request parameter, allocate, to the first UE, a second PUSCH resource used for sending data.

Optionally, the first allocation unit 1202 is configured to:
send a first uplink scheduling grant UL-grant message to the first UE, where the first UL-grant message includes information about the first PUSCH resource allocated to the first UE; or
notify PUSCH scheduling information of second UE to the first UE, where the PUSCH scheduling information of the second UE includes information about a third PUSCH resource that is allocated by the apparatus to the second UE and that is used for sending data; and instruct the first UE to use the third PUSCH resource as the first PUSCH resource that is used by the first UE to send resource request information, where the base station configures different cyclic shift values for the first UE and the second UE, so that the first UE and the second UE use the third PUSCH resource by using the different cyclic shift values; or
use, as the first PUSCH resource, an uplink semi-persistent scheduling SPS resource pre-allocated by the pre-allocation unit 1205 to the first UE.

Optionally, the first allocation unit 1202 is configured to:
send a radio network temporary identifier RNTI used by the second UE to the first UE, so that the first UE obtains the PUSCH scheduling information of the second UE based on the RNTI used by the second UE.

Optionally, the pre-allocation unit 1205 is configured to pre-allocate a common uplink SPS resource to the first UE and at least one third UE.

If the pre-allocation unit 1205 pre-allocates the common uplink SPS resource to the first UE and the at least one third UE, and the detection unit 1203 detects resource request information separately sent by the first UE and the at least one third UE, and determines that the first UE and the at least one third UE request to send data on the common uplink SPS resource, the second allocation unit 1204 allocates a PUSCH resource that is different from a PUSCH resource used by the at least one third UE to the first UE, and uses the PUSCH resource as the second PUSCH resource used by the first UE to send data.

Optionally, the second PUSCH resource is the common uplink SPS resource.

Optionally, the pre-allocation unit is configured to pre-allocate a common uplink SPS resource to the first UE and at least one third UE.

If the pre-allocation unit 1205 pre-allocates the common uplink SPS resource to the first UE and the at least one third UE, and the detection unit 1203 detects resource request information separately sent by the first UE and the at least one third UE, and determines that the first UE and the at least one third UE request to send data on the common uplink SPS resource, the second allocation unit 1204 indicates time resources on which the first UE and the at least one third UE separately occupy the uplink SPS resource, and uses, as the second PUSCH resource that is allocated to the first UE and that is used for sending data, the uplink SPS resource occupied by the first UE on an indicated time resource.

Optionally, the second allocation unit 1204 is configured to:

send a second UL-grant message to the first UE, where the second UL-grant message carries indication information, and the indication information is used to indicate a time resource on which the first UE occupies the uplink SPS resource; where based on a mapping relationship between a bit that can be multiplexed in the second UL-grant message and a time resource of the uplink SPS resource, the indication information is marked in a bit that is corresponding to the time resource allocated to the first UE and that is in the bit that can be multiplexed.

Optionally, the resource request parameter includes one or more of a cyclic shift value, a time-frequency resource location, a resource request period, and an orthogonal cover code (OCC).

Optionally, a pilot symbol of the first PUSCH resource is used by the first UE to send resource request information.

Figure 13:
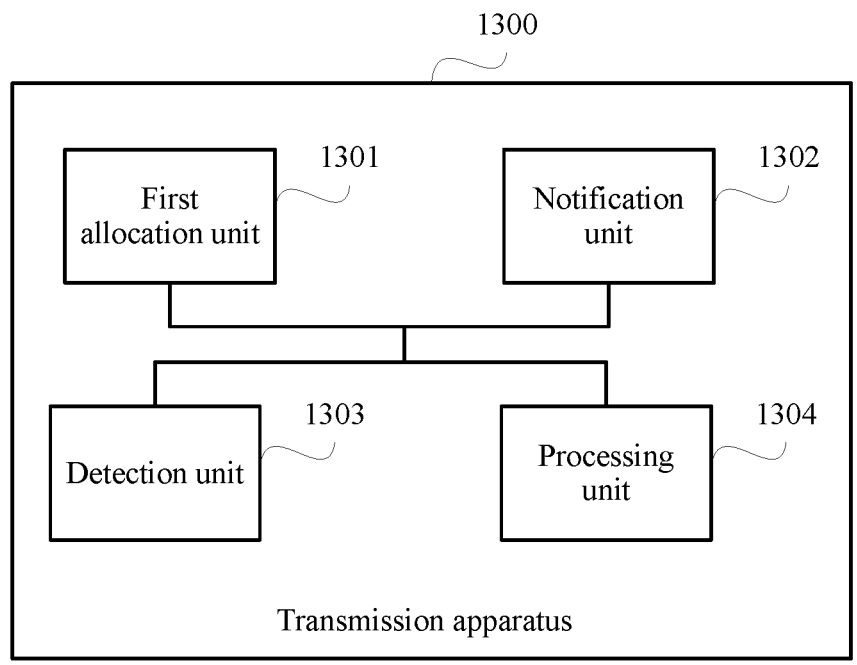

Based on a same inventive concept, referring to FIG. 13, this application further provides another transmission apparatus 1300, configured to perform the transmission method provided in this application. The transmission apparatus 1300 includes a first allocation unit 1301, a notification unit 1302, a detection unit 1303, and a processing unit 1304.

The first allocation unit 1301 is configured to: allocate, to first user equipment UE, a physical uplink shared channel PUSCH resource used for sending data, where the first UE and at least one second UE share the PUSCH resource; and configure, for the first UE, a resource request parameter and a time resource occupied to send data on the PUSCH resource.

The notification unit 1302 is configured to notify, to the first UE, the resource request parameter and the time resource occupied to send data on the PUSCH resource that are configured by the first allocation unit.

The detection unit 1303 is configured to detect, on the PUSCH resource based on the resource request parameter configured for the first UE, resource request information sent by the first UE.

The processing unit 1304 is configured to: if the detection unit detects, on the PUSCH resource based on the resource request parameter configured for the first UE, resource request information sent by the first UE, process, on the time resource occupied by the first UE on the PUSCH resource, data sent by the first UE.

Optionally, the resource request parameter includes a cyclic shift value and a time-frequency resource location.

Both the time resource occupied to send data on the PUSCH resource and a cyclic shift value that are of the first UE are different from those of the at least one second UE.

Optionally, the notification unit 1302 is configured to:

notify, to the first UE by using a radio resource control RRC message or an uplink scheduling grant UL-grant message, the resource request parameter and the time resource occupied to send data on the PUSCH resource.

Figure 14:
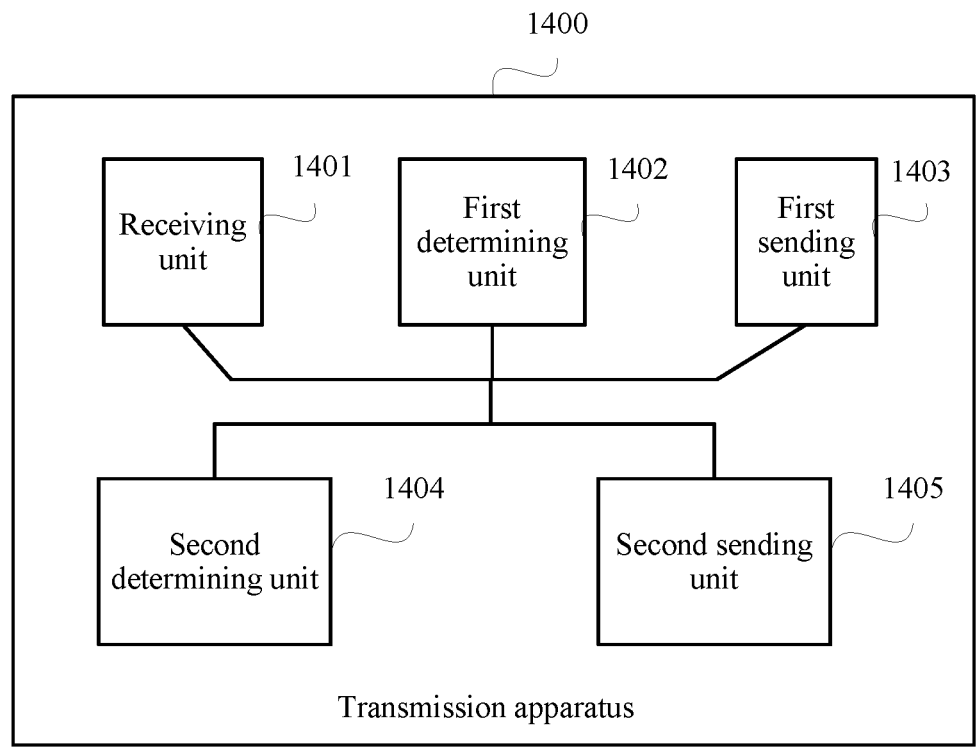

Based on a same inventive concept, referring to FIG. 14, this application further provides another transmission apparatus 1400, applied to first user equipment UE, and including a receiving unit 1401, a first determining unit 1402, a first sending unit 1403, a second determining unit 1404, and a second sending unit 1405.

The receiving unit 1401 is configured to receive a resource request parameter configured by a base station.

The first determining unit 1402 is configured to determine a first physical uplink shared channel PUSCH resource allocated by the base station.

The first sending unit 1403 is configured to send resource request information to the base station on the first PUSCH resource based on the resource request parameter.

The second determining unit 1404 is configured to determine a second PUSCH resource that is allocated by the base station and that is used for sending data.

The second sending unit 1405 is configured to send data on the second PUSCH resource.

Optionally, the first determining unit 1402 is configured to:

determine, based on a received first uplink scheduling grant UL-grant message sent by the base station, the first PUSCH resource allocated by the base station; or determine, based on PUSCH scheduling information that is of a second UE and that is notified by the base station, a third PUSCH resource that is included in the PUSCH scheduling information of the second UE, allocated by the base station to the second UE, and used for sending data as the first PUSCH resource allocated by the base station; or determine, based on an instruction of the base station, an uplink semi-persistent scheduling SPS resource pre-allocated by the base station as the first PUSCH resource allocated by the base station.

Optionally, the first determining unit 1402 is configured to:

obtain the PUSCH scheduling information of the second UE based on a received radio network temporary identifier RNTI that is sent by the base station and that is used by the second UE.

Optionally, if the first determining unit 1402 determines the third PUSCH resource as the first PUSCH resource, the first sending unit 1403 sends resource request information to the base station on the third PUSCH resource based on a cyclic shift value configured by the base station for the first UE, where the cyclic shift value of the first UE is different from a cyclic shift value of the second UE.

Optionally, the second determining unit 1404 is configured to:

determine, based on a received instruction sent by the base station, that the instruction includes information about the second PUSCH resource; and send data on the second PUSCH resource based on the instruction.

Optionally, if the first UE knows an uplink SPS resource that is allocated by the base station to the first UE and that is used for sending data, the second determining unit 1404 is configured to:

receive a second UL-grant message sent by the base station, and determine, based on indication information marked in a bit that can be multiplexed in the second UL-grant message and a mapping relationship between the bit that can be multiplexed and a time resource of the uplink SPS resource, a time resource that is allocated by the base station and that is occupied on the uplink SPS resource; and send data on the time resource occupied on the uplink SPS resource.

Optionally, the first sending unit is further configured to send data on the uplink SPS resource if the first UE knows the uplink SPS resource that is allocated by the base station to the first UE and that is used for sending data, and receives, after sending resource request information to the base station, no information about the second PUSCH resource that is allocated by the base station and that is used for sending data.

Optionally, the resource request parameter includes one or more of a cyclic shift value, a time-frequency resource location, a resource request period, and an orthogonal cover code OCC.

Optionally, the first sending unit 1403 sends resource request information to the base station on a pilot symbol of the first PUSCH resource based on the resource request parameter.

Figure 15:
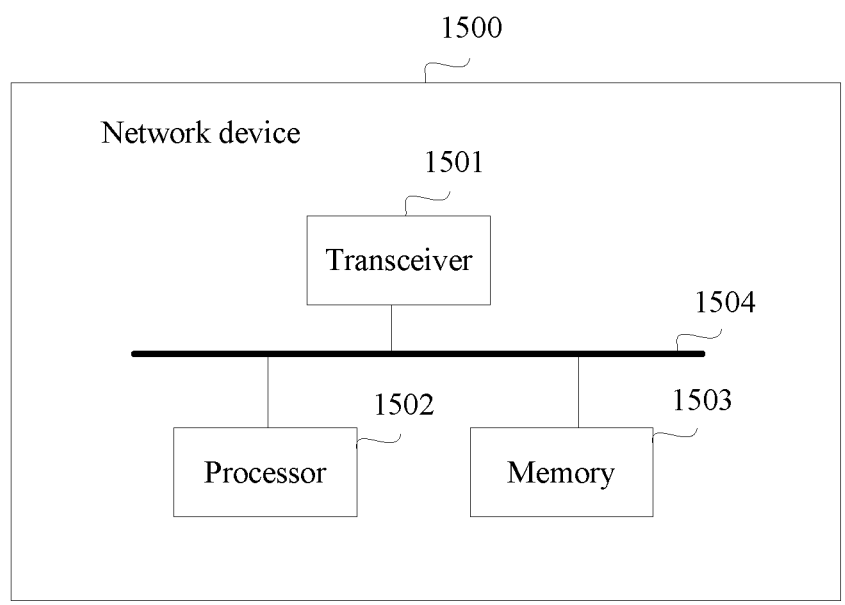
FIG. 15 and FIG. 16 are schematic structural diagrams of user equipment according to this application.

Based on a same inventive concept, referring to FIG. 15, this application provides a network device 1500, including a transceiver 1501, a processor 1502, a memory 1503, and a bus 1504. The transceiver 1501, the processor 1502, and the memory 1503 are all connected to the bus 1504, the memory 1503 stores a group of programs, and the processor 1502 is configured to invoke the programs stored in the memory 1503, so that the network device 1500 performs the transmission method in this application.

In FIG. 15, a bus architecture may include any quantity of interconnected buses and bridges, and specifically links various circuits of one or more processors represented by the processor 1502 and a memory represented by the memory 1503. The bus architecture may further link together various other circuits such as a peripheral device, a voltage regulator, and a power management circuit, which is well known in the art, and therefore no further description is provided in this specification. The bus provides an interface. The transceiver 1501 may be a plurality of components. To be specific, the transceiver includes a transmitter and a receiver, and provides a unit configured to communicate with various other apparatuses on a transmission medium. The processor 1502 is responsible for bus architecture management and general processing. The memory 1503 may store data used when the processor 1502 performs an operation.

Figure 16:
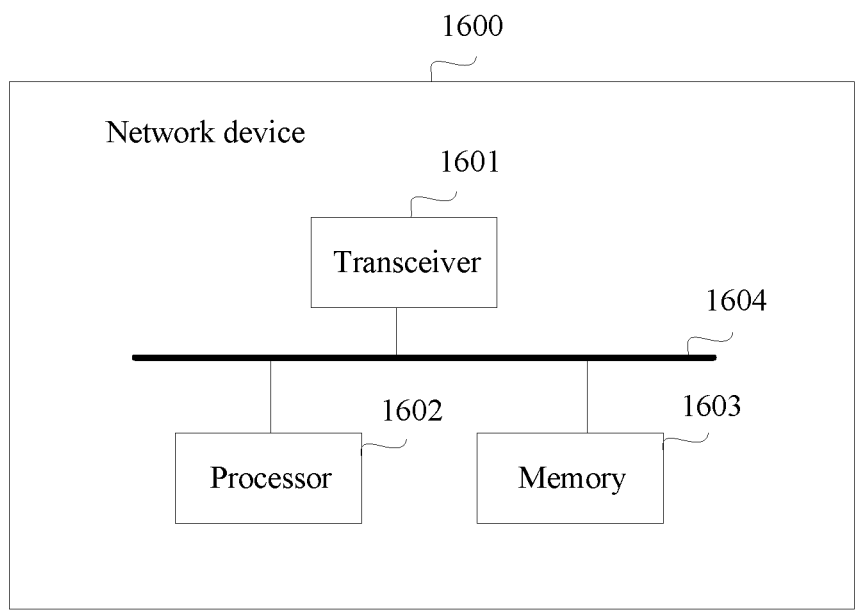

Based on a same inventive concept, referring to FIG. 16, this application provides a network device 1600, including a transceiver 1601, a processor 1602, a memory 1603, and a bus 1604. The transceiver 1601, the processor 1602, and the memory 1603 are all connected to the bus 1604, the memory 1603 stores a group of programs, and the processor 1602 is configured to invoke the programs stored in the memory 1603, so that the network device 1600 performs the transmission method in this application.

In FIG. 16, a bus architecture may include any quantity of interconnected buses and bridges, and specifically links various circuits of one or more processors represented by the processor 1602 and a memory represented by the memory 1603. The bus architecture may further link together various other circuits such as a peripheral device, a voltage regulator, and a power management circuit, which is well known in the art, and therefore no further description is provided in this specification. The bus provides an interface. The transceiver 1601 may be a plurality of components. To be specific, the transceiver includes a transmitter and a transceiver, and provides a unit configured to communicate with various other apparatuses on a transmission medium. The processor 1602 is responsible for bus architecture management and general processing. The memory 1603 may store data used when the processor 1602 performs an operation.

Figure 17:
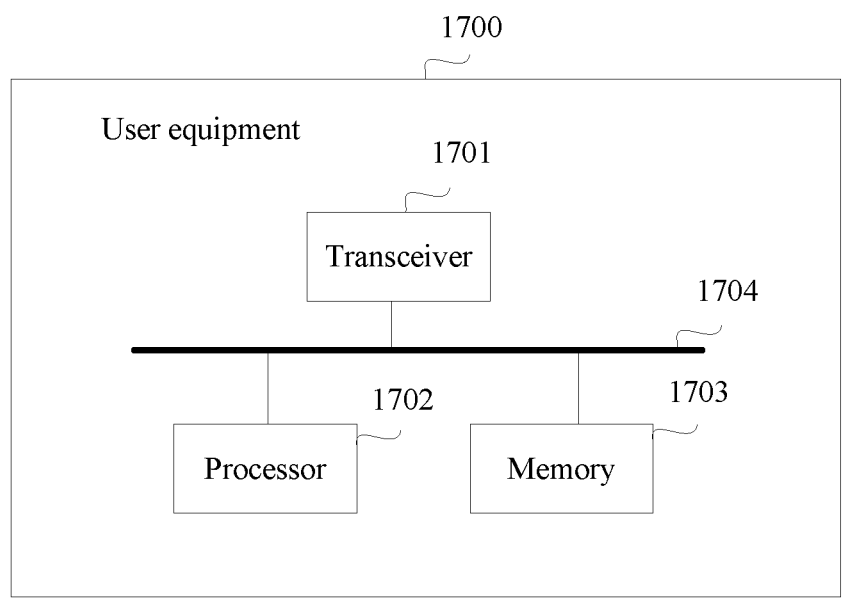
FIG. 17 is a schematic structural diagram of user equipment according to this application.

Based on a same inventive concept, referring to FIG. 17, this application provides user equipment 1700, including a transceiver 1701, a processor 1702, a memory 1703, and a bus 1704. The transceiver 1701, the processor 1702, and the memory 1703 are all connected to the bus 1704, the memory 1703 stores a group of programs, and the processor 1702 is configured to invoke the programs stored in the memory 1703, so that the user equipment 1700 performs the transmission method in this application.

In FIG. 17, a bus architecture may include any quantity of interconnected buses and bridges, and specifically links various circuits of one or more processors represented by the processor 1702 and a memory represented by the memory 1703. The bus architecture may further link together various other circuits such as a peripheral device, a voltage regulator, and a power management circuit, which is well known in the art, and therefore no further description is provided in this specification. The bus provides an interface. The transceiver 1701 may be a plurality of components. To be specific, the transceiver includes a transmitter and a transceiver, and provides a unit configured to communicate with various other apparatuses on a transmission medium. The processor 1702 is responsible for bus architecture management and general processing. The memory 1703 may store data used when the processor 1702 performs an operation.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Apparently, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A transmission method, comprising:
    configuring, by abase station, a resource request parameter for a first user equipment (UE), and sending the resource request parameter to the first UE, wherein the resource request parameter instructs the first UE to send resource request information based on the resource request parameter;
    allocating, by the base station, a first physical uplink shared channel (PUSCH) resource to the first UE, wherein the first PUSCH resource is used by the first UE to send resource request information to the base station based on the resource request parameter; and
    allocating, by the base station to the first UE when the base station detects, on the first PUSCH resource, resource request information sent by the first UE based on the resource request parameter, a second PUSCH resource used for sending data;
    allocating, by the base station, an uplink semi-persistent scheduling (SPS) resource to the first UE that is used for sending data;
    allocating, by the base station, a time resource to the first UE and that is occupied on the uplink SPS resource;
    sending, by the base station, a second uplink scheduling (UL)-grant message to the first UE, wherein the second UL-grant message includes indication information marked in a bit that can be multiplexed and a mapping relationship between the bit that can be multiplexed and the time resource of the uplink SPS resource, and sending data on the time resource occupied on the uplink SPS resource.

2. The method according to claim 1, wherein the allocating, by the base station to the first UE when the base station detects resource request information sent by the first UE, a second PUSCH resource used for sending data comprises:
    if the base station pre-allocates a common uplink SPS resource to the first UE and at least one third UE, detects resource request information separately sent by the first UE and the at least one third UE, and determines that the first UE and the at least one third UE request to send data on the common uplink SPS resource, allocating, by the base station, a PUSCH resource that is different from a PUSCH resource used by the at least one third UE to the first UE, and using the PUSCH resource as the second PUSCH resource used by the first UE to send data.

3. The method according to claim 2, wherein the second PUSCH resource is the common uplink SPS resource.

4. The method according to claim 1, wherein the allocating, by the base station, a first PUSCH resource to the first UE comprises:
    sending, by the base station, a first uplink scheduling grant message to the first UE, wherein the first uplink scheduling grant message comprises information about the first PUSCH resource allocated to the first UE; or
    notifying, by the base station, PUSCH scheduling information of second UE to the first UE, wherein the PUSCH scheduling information of the second UE comprises information about a third PUSCH resource that is allocated by the base station to the second UE and that is used for sending data; and instructing the first UE to use the third PUSCH resource as the first PUSCH resource that is used by the first UE to send resource request information to the base station, wherein the base station configures different cyclic shift values for the first UE and the second UE, so that the first UE and the second UE use the third PUSCH resource by using the different cyclic shift values; or
    using, by the base station as the first PUSCH resource, an uplink semi-persistent scheduling SPS resource pre-allocated to the first UE.

5. The method according to claim 1, wherein the resource request parameter comprises one or more of a cyclic shift value, a time-frequency resource location, a resource request period, or an orthogonal cover code (OCC).

6. The method according to claim 1, wherein a pilot symbol of the first PUSCH resource is used by the first UE to send resource request information to the base station.

7. A transmission method, comprising:
    receiving, by first user equipment (UE), a resource request parameter configured by a base station, wherein the resource request parameter instructs the first UE to send resource request information based on the resource request parameter;
    determining, by the first UE, a first physical uplink shared channel (PUSCH) resource allocated by the base station, and sending resource request information to the base station on the first PUSCH resource based on the resource request parameter; and
    determining, by the first UE, a second PUSCH resource that is allocated by the base station and that is used for sending data, and sending data on the second PUSCH resource, wherein if the first UE knows an uplink SPS resource that is allocated by the base station to the first UE and that is used for sending data, the determining, by the first UE, the second PUSCH resource that is allocated by the base station and that is used for sending data, and sending data on the second PUSCH resource comprises:

receiving, a second uplink scheduling (UL)-grant message sent by the base station, and determining, based on indication information marked in a bit that can be multiplexed in the second UL-grant message and a mapping relationship between the bit that can be multiplexed and a time resource of the uplink SPS resource, a time resource that is allocated by the base station to the first UE and that is occupied on the uplink SPS resource; and sending data on the time resource occupied on the uplink SPS resource.

8. The method according to claim 7, wherein the determining, by the first UE, the first PUSCH resource allocated by the base station comprises:

determining, by the first UE based on a received first uplink scheduling grant message sent by the base station, the first PUSCH resource allocated by the base station; or determining, by the first UE based on PUSCH scheduling information that is of a second UE and that is notified by the base station, a third PUSCH resource that is comprised in the PUSCH scheduling information of the second UE, allocated by the base station to the second UE, and used for sending data as the first PUSCH resource allocated by the base station; or determining, by the first UE based on an instruction of the base station, an uplink semi-persistent scheduling SPS resource pre-allocated by the base station as the first PUSCH resource allocated by the base station.

9. The method according to claim 8, wherein if the first UE determines the third PUSCH resource as the first PUSCH resource, the first UE sends resource request information to the base station on the third PUSCH resource based on a cyclic shift value configured by the base station for the first UE, wherein the cyclic shift value of the first UE is different from a cyclic shift value of the second UE.

10. The method according to claim 7, wherein the determining, by the first UE, a second PUSCH resource that is allocated by the base station and that is used for sending data, and sending data on the second PUSCH resource comprises:

determining, by the first UE based on a received instruction sent by the base station, that the instruction comprises information about the second PUSCH resource; and sending data on the second PUSCH resource based on the instruction.

11. The method according to claim 7, wherein the resource request parameter comprises one or more of a cyclic shift value, a time-frequency resource location, a resource request period, and an orthogonal cover code (OCC).

12. The method according to claim 7, wherein the first UE sends resource request information to the base station on a pilot symbol of the first PUSCH resource based on the resource request parameter.

13. A transmission apparatus, comprising:
a processor; and
a non-transitory memory, wherein the memory stores one or more executable instructions that, when executed, enable the device to perform the following operations:

receiving a resource request parameter configured by a base station, wherein the resource request parameter instructs the transmission apparatus to send resource request information based on the resource request parameter;

determining a first physical uplink shared channel (PUSCH) resource allocated by the base station, and sending resource request information to the base station on the first PUSCH resource based on the resource request parameter; and determining a second PUSCH resource that is allocated by the base station and that is used for sending data, and sending data on the second PUSCH resource, wherein if the apparatus knows an uplink SPS resource that is allocated by the base station to the apparatus and that is used for sending data, the determining the second PUSCH resource that is allocated by the base station and that is used for sending data, and sending data on the second PUSCH resource comprises:

receiving, a second UL-grant message sent by the base station, and determining, based on indication information marked in a bit that can be multiplexed in the second UL-grant message and a mapping relationship between the bit that can be multiplexed and a time resource of the uplink SPS resource, a time resource that is allocated by the base station to the apparatus and that is occupied on the uplink SPS resource; and sending data on the time resource occupied on the uplink SPS resource.

14. The apparatus according to claim 13, wherein the determining a first PUSCH resource allocated by the base station comprises:

determining, based on a received first uplink scheduling grant message sent by the base station, the first PUSCH resource allocated by the base station; or determining, based on PUSCH scheduling information that is of a second UE and that is notified by the base station, a third PUSCH resource that is comprised in the PUSCH scheduling information of the second UE, allocated by the base station to the second UE, and is used for sending data as the first PUSCH resource allocated by the base station; or determining, based on an instruction of the base station, an uplink semi-persistent scheduling SPS resource pre-allocated by the base station as the first PUSCH resource allocated by the base station.

15. The apparatus according to claim 14, wherein if the apparatus determines the third PUSCH resource as the first PUSCH resource, the apparatus sends resource request information to the base station on the third PUSCH resource based on a cyclic shift value configured by the base station for a first UE, wherein the cyclic shift value of the first UE is different from a cyclic shift value of the second UE.

16. The apparatus according to claim 13, wherein the determining a second PUSCH resource that is allocated by the base station and that is used for sending data, and sending data on the second PUSCH resource comprises:

determining, based on a received instruction sent by the base station, that the instruction comprises information about the second PUSCH resource; and sending data on the second PUSCH resource based on the instruction.

17. The apparatus according to claim 13, further comprising:

sending, data on the uplink SPS resource if the apparatus knows the uplink SPS resource that is allocated by the base station to the apparatus and that is used for sending data, and receives, after sending resource request information to the base station, no information about the second PUSCH resource that is allocated by the base station and that is used for sending data.

18. The apparatus according to claim 13, wherein the resource request parameter comprises one or more of a cyclic shift value, a time-frequency resource location, a resource request period, and an orthogonal cover code OCC.

19. The apparatus according to claim 13, wherein the apparatus sends resource request information to the base station on a pilot symbol of the first PUSCH resource based on the resource request parameter.

\* \* \* \* \*